Aug. 25, 1925.

O. W. COWGILL 1,551,189

BOX MAKING MACHINE

Filed Jan. 19, 1923     29 Sheets-Sheet 1

Inventor
Orph W. Cowgill
By F. R. Cornwall Atty.

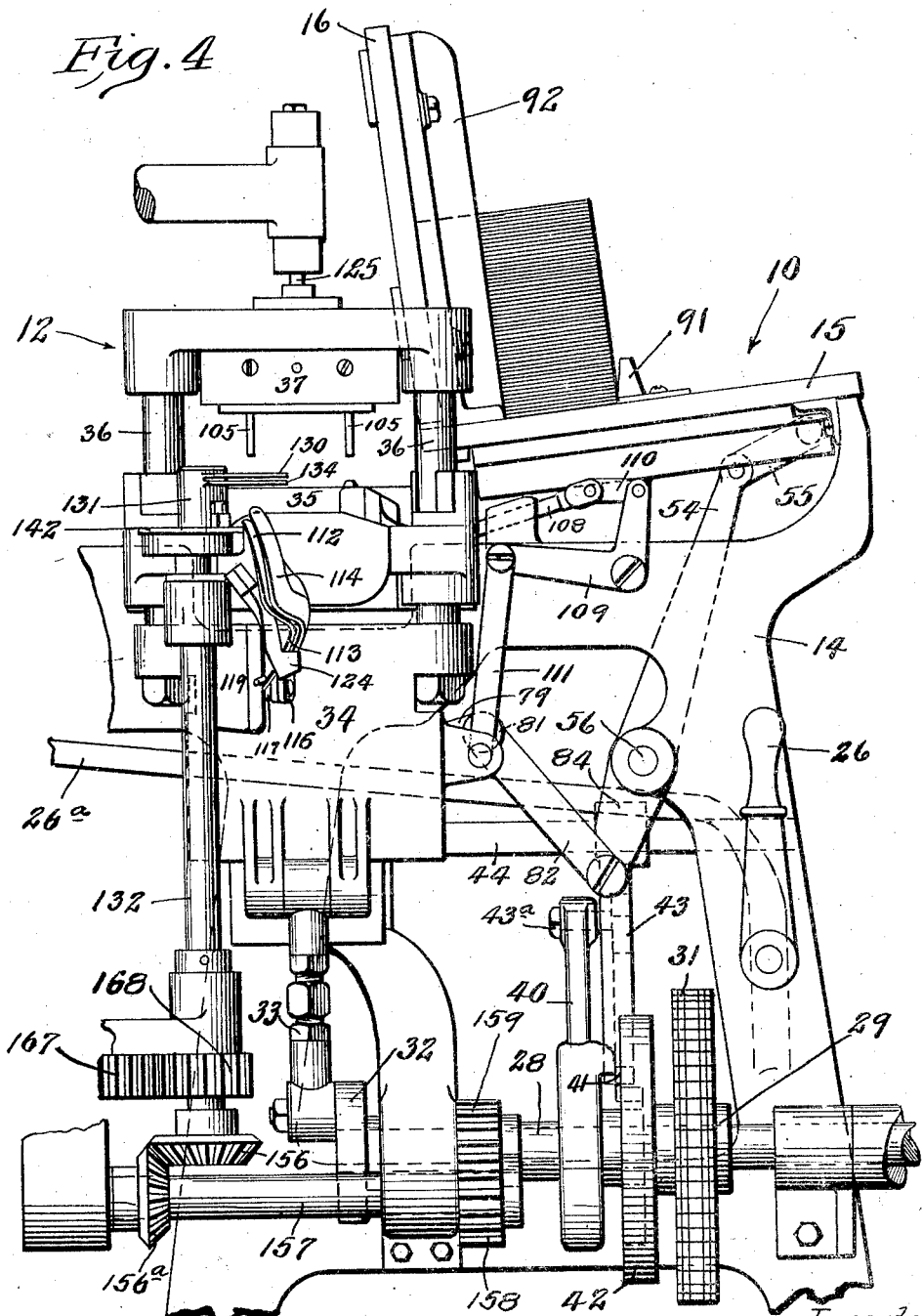

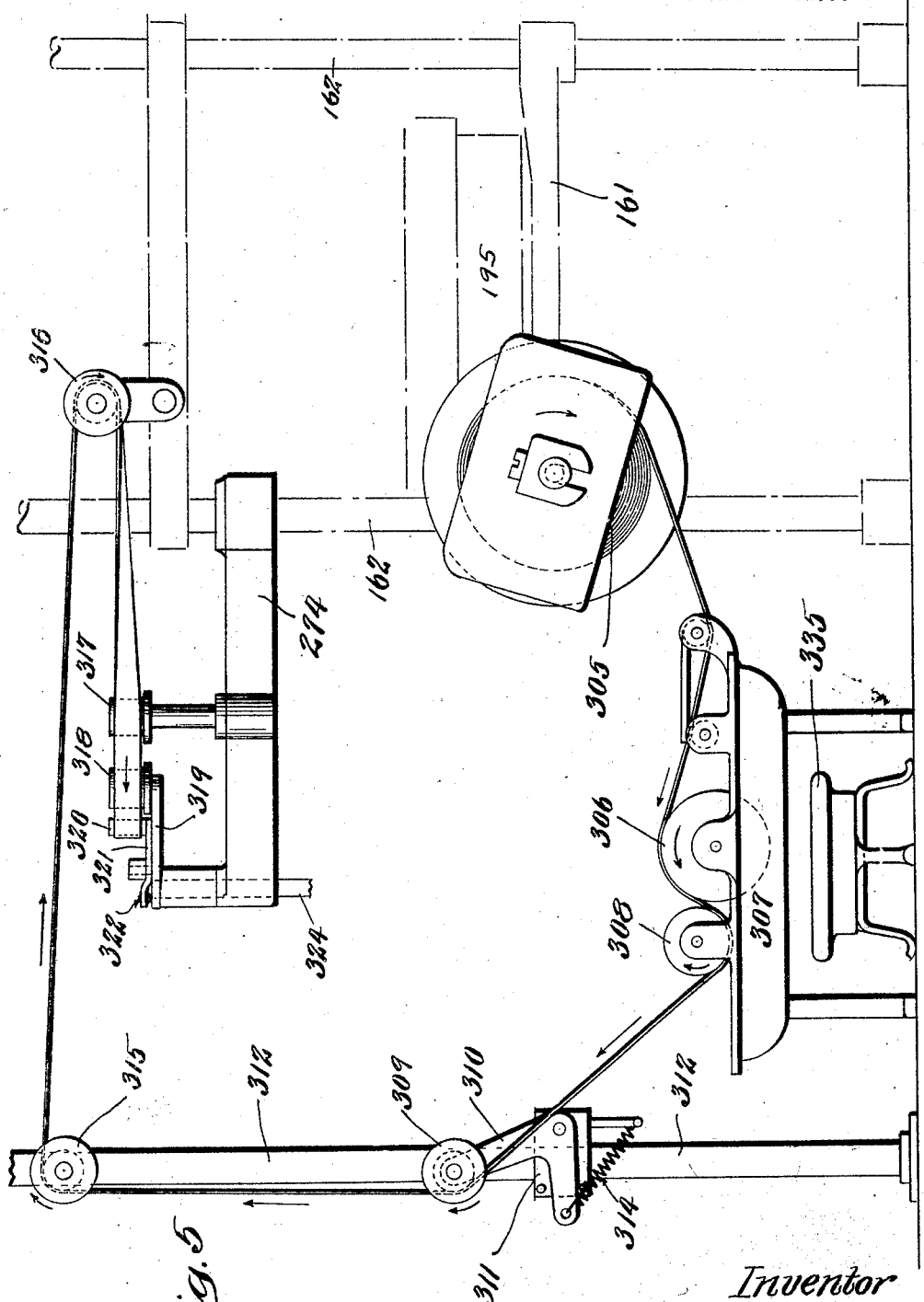

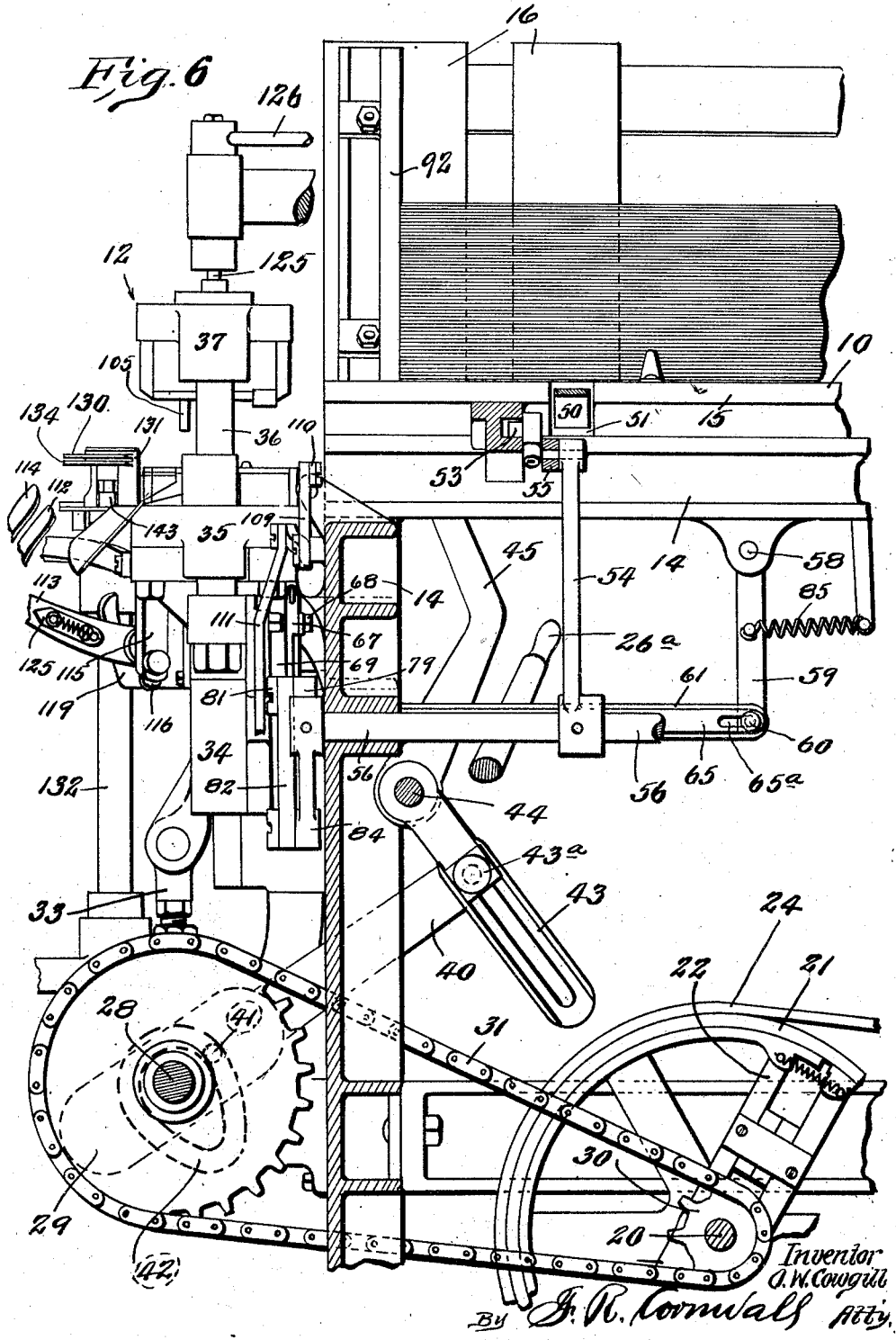

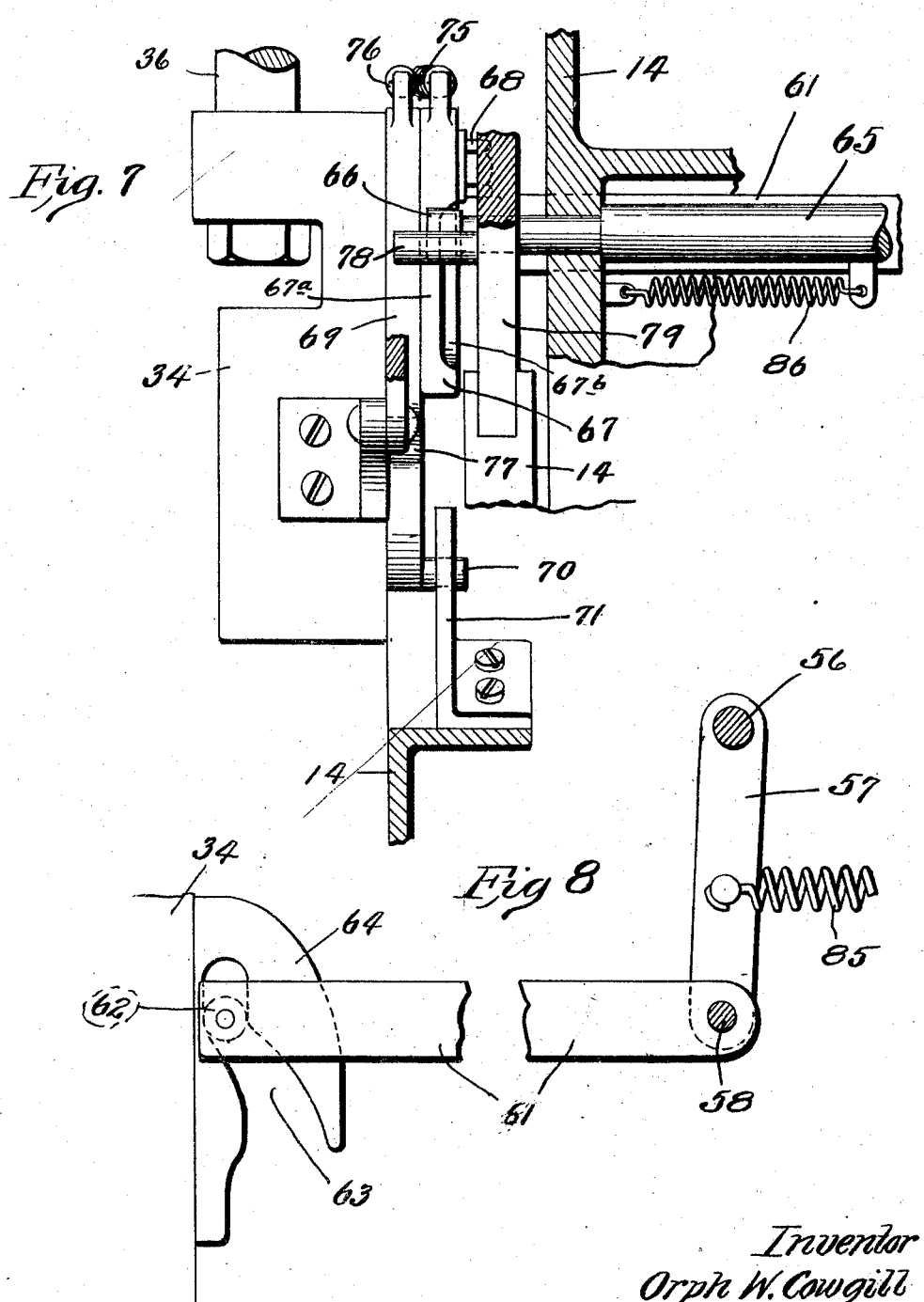

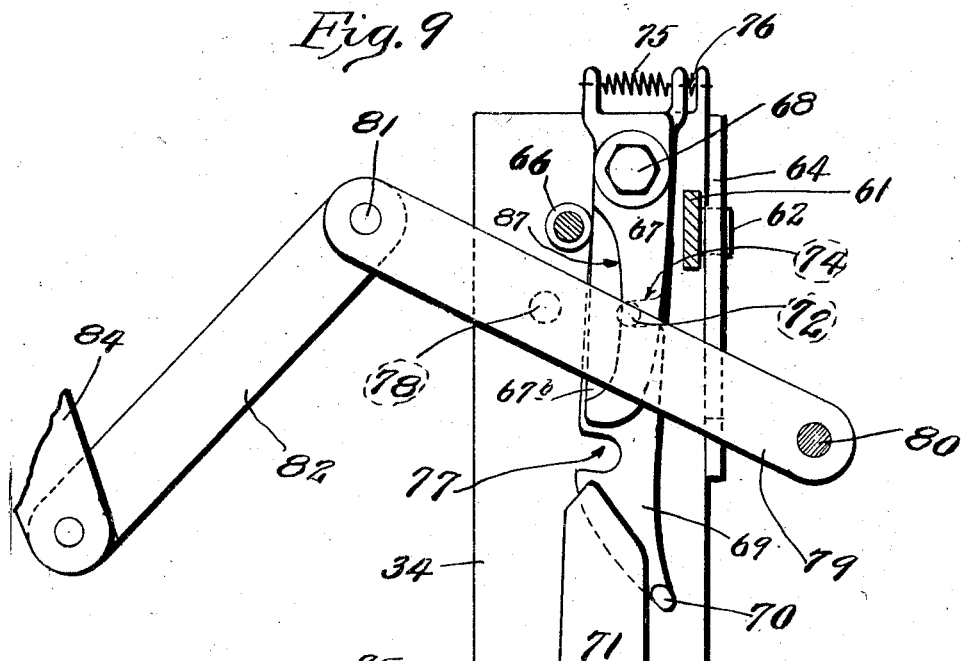
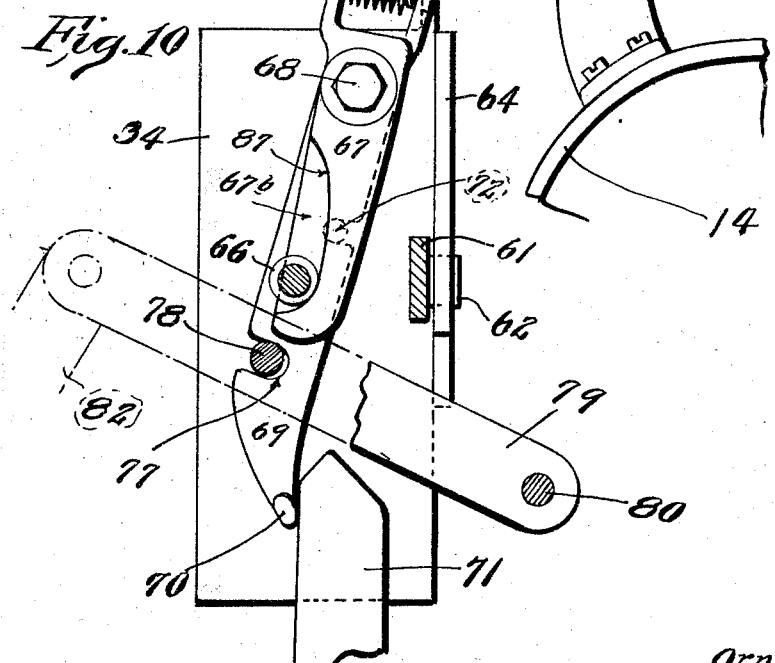

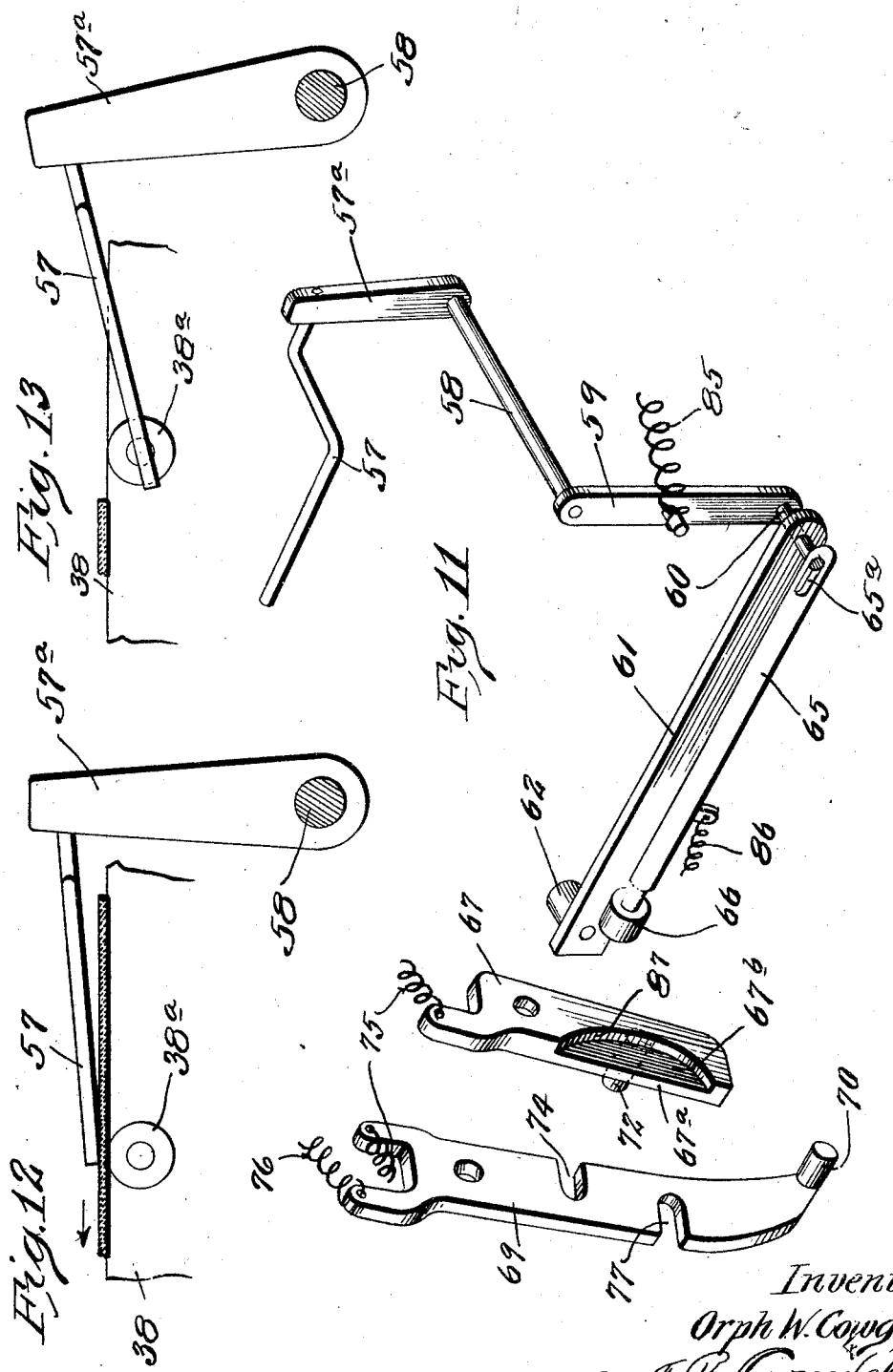

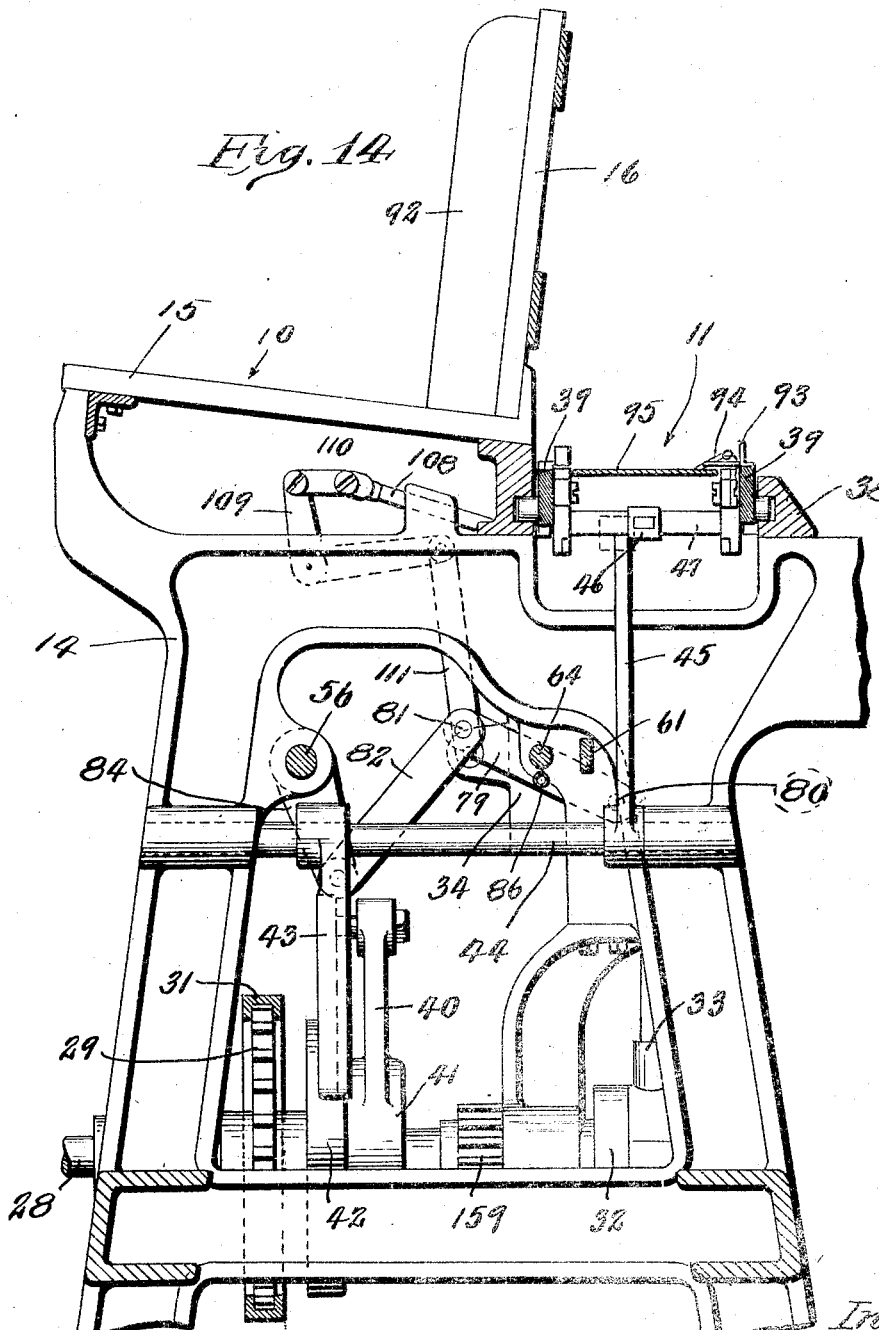

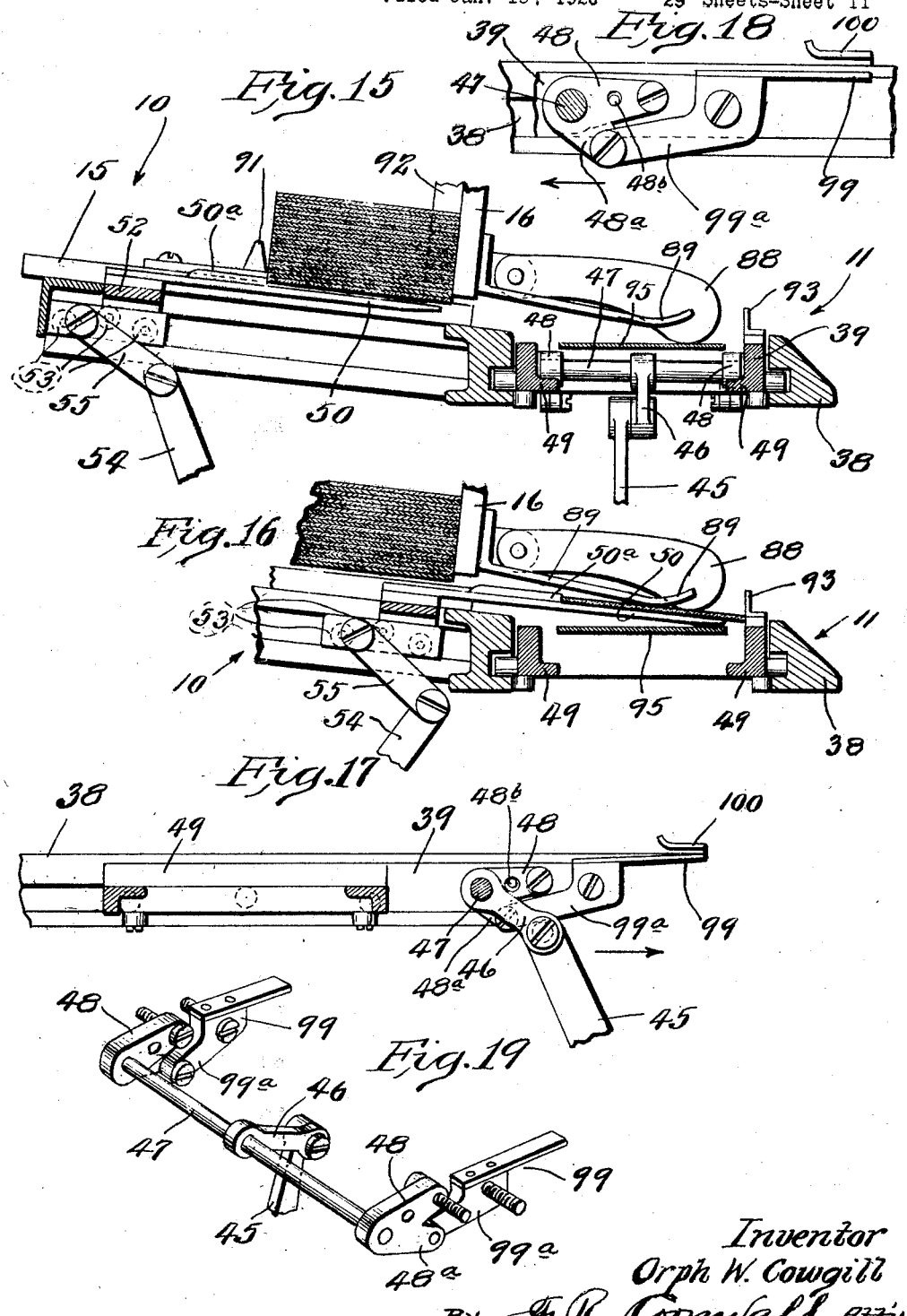

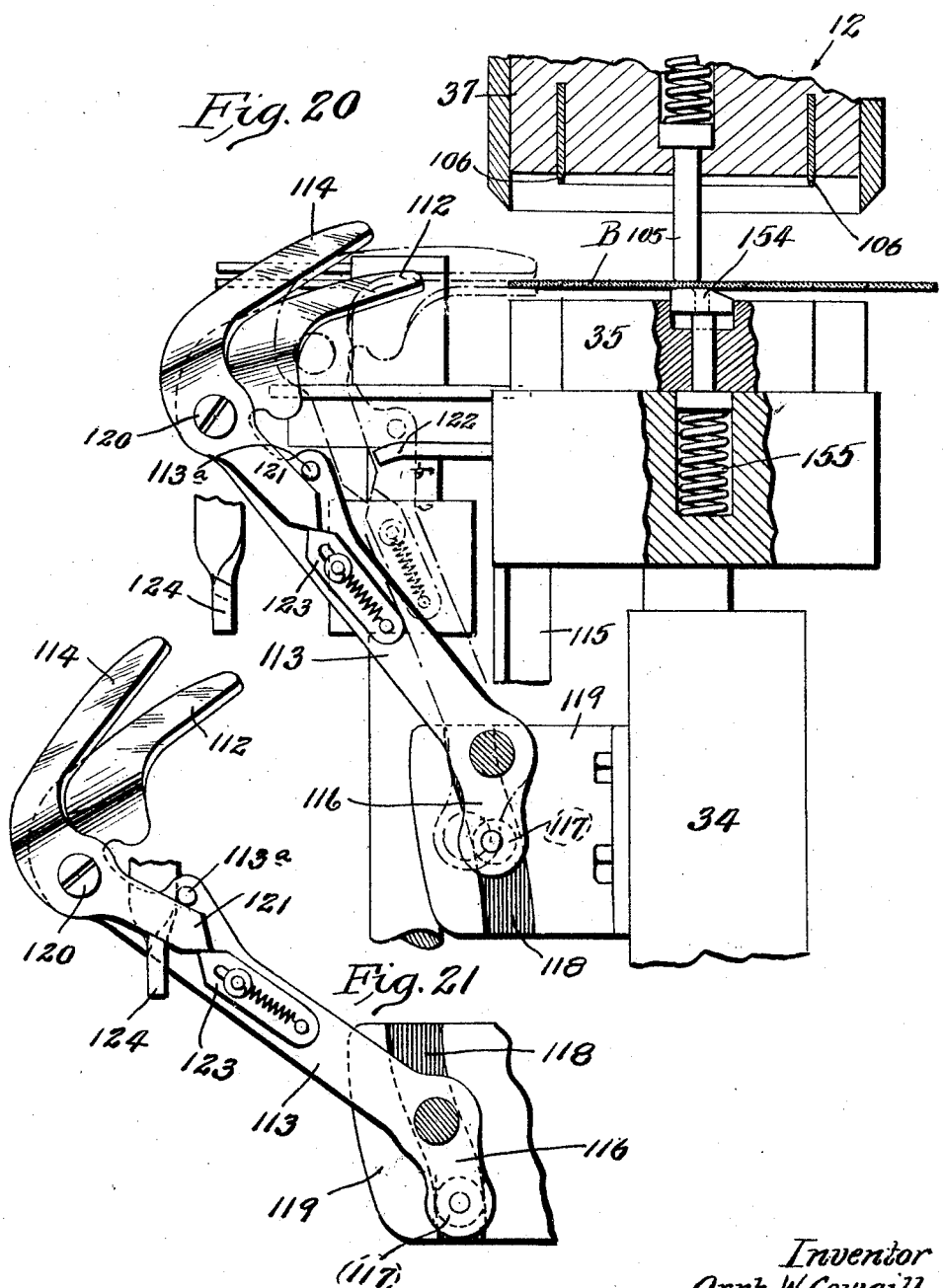

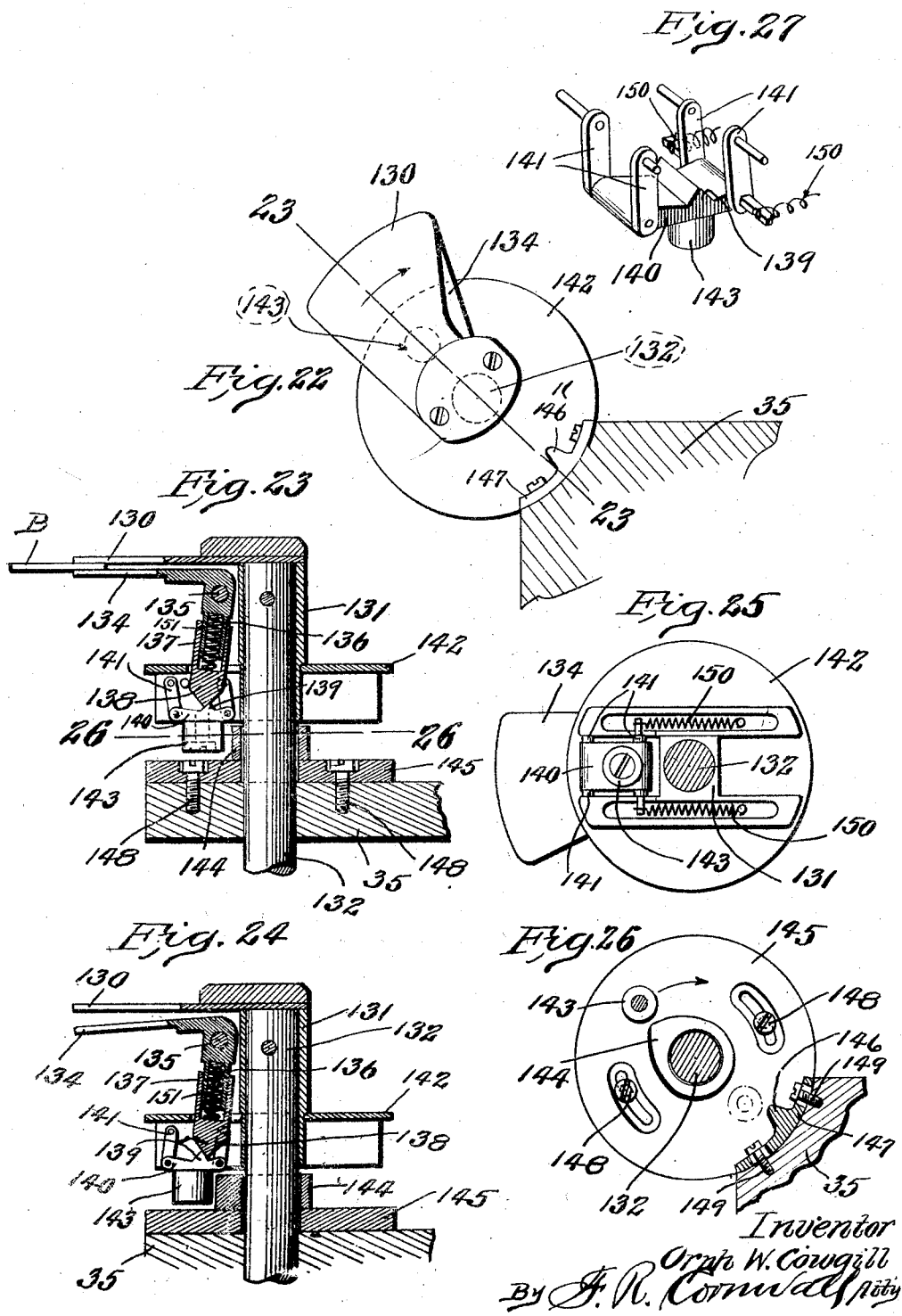

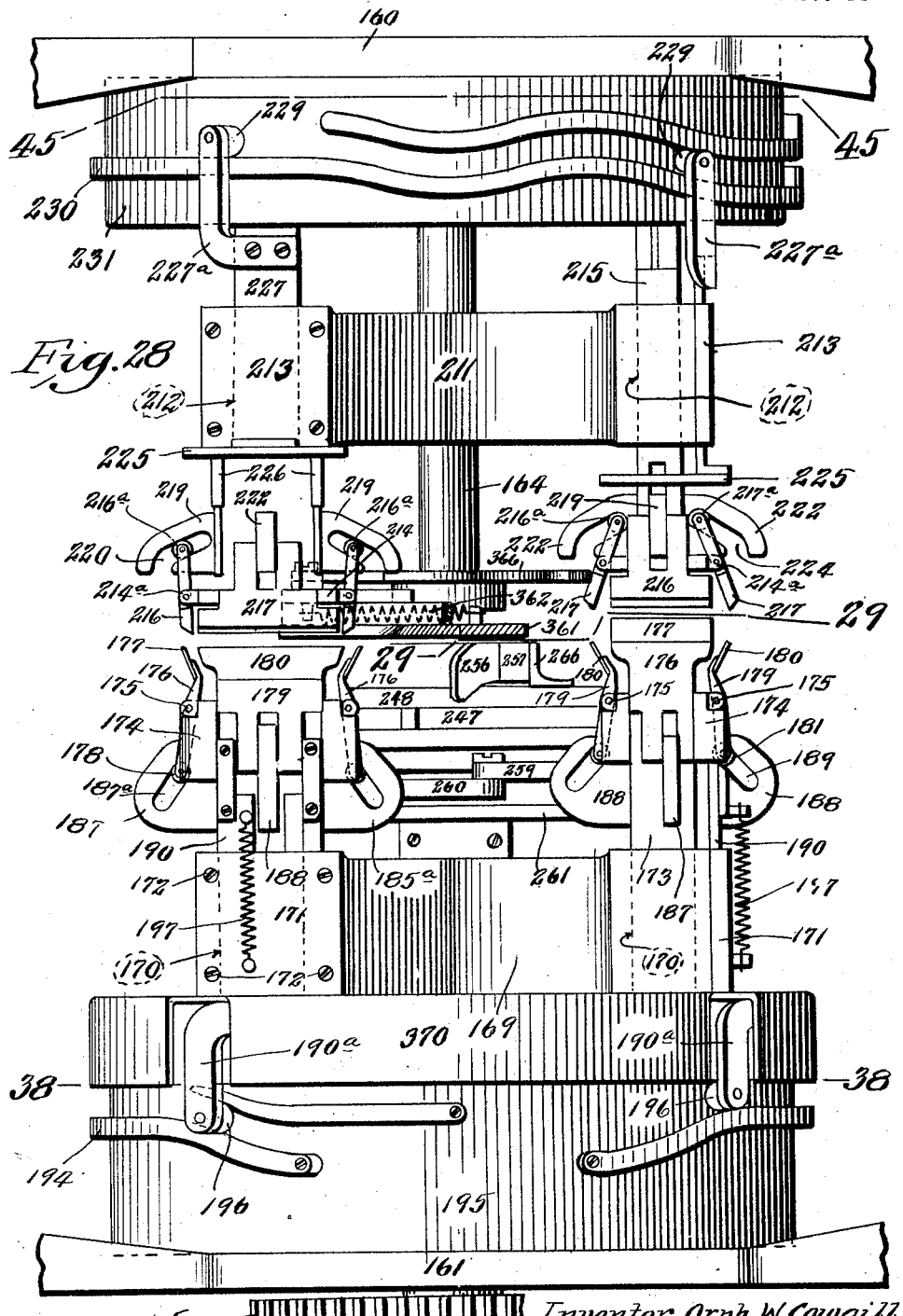

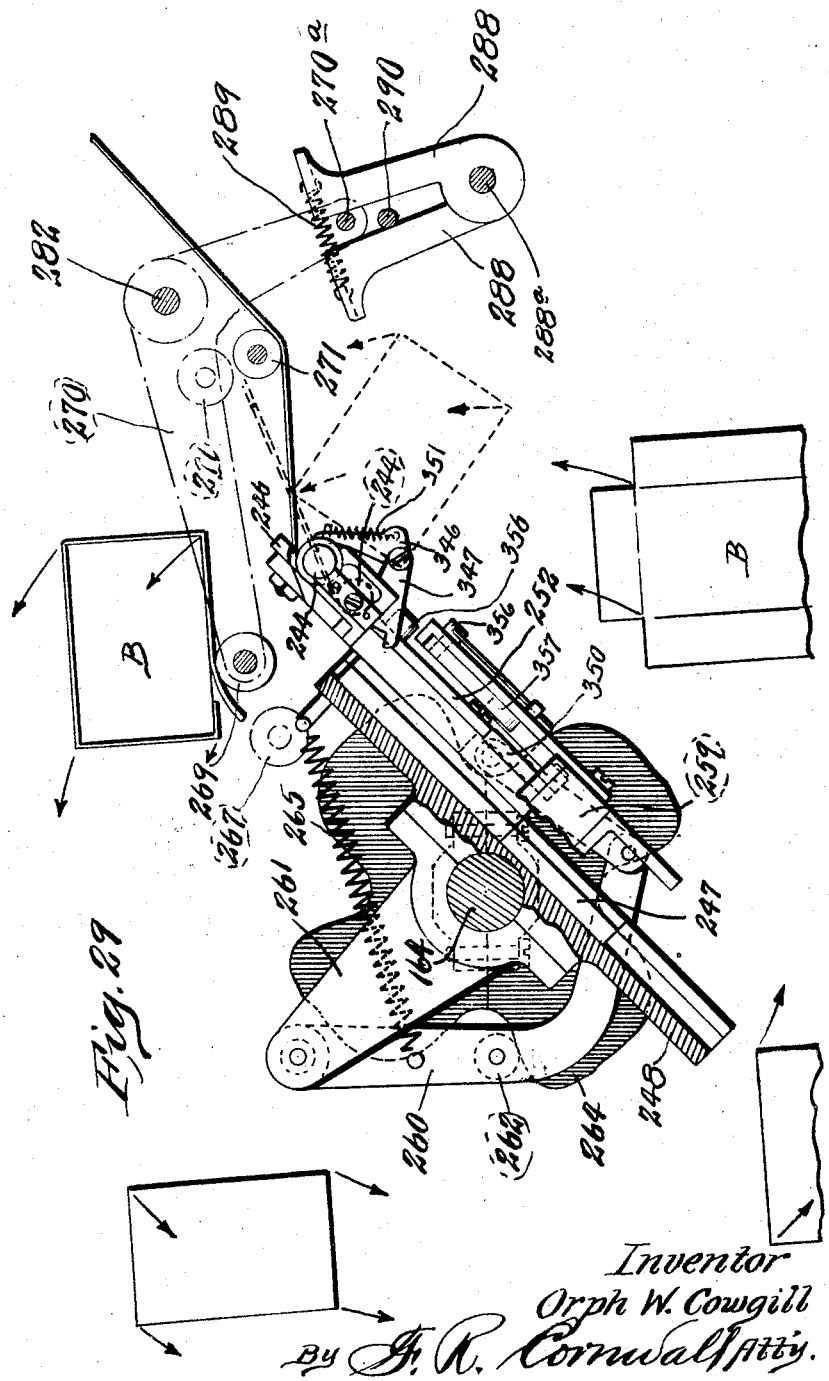

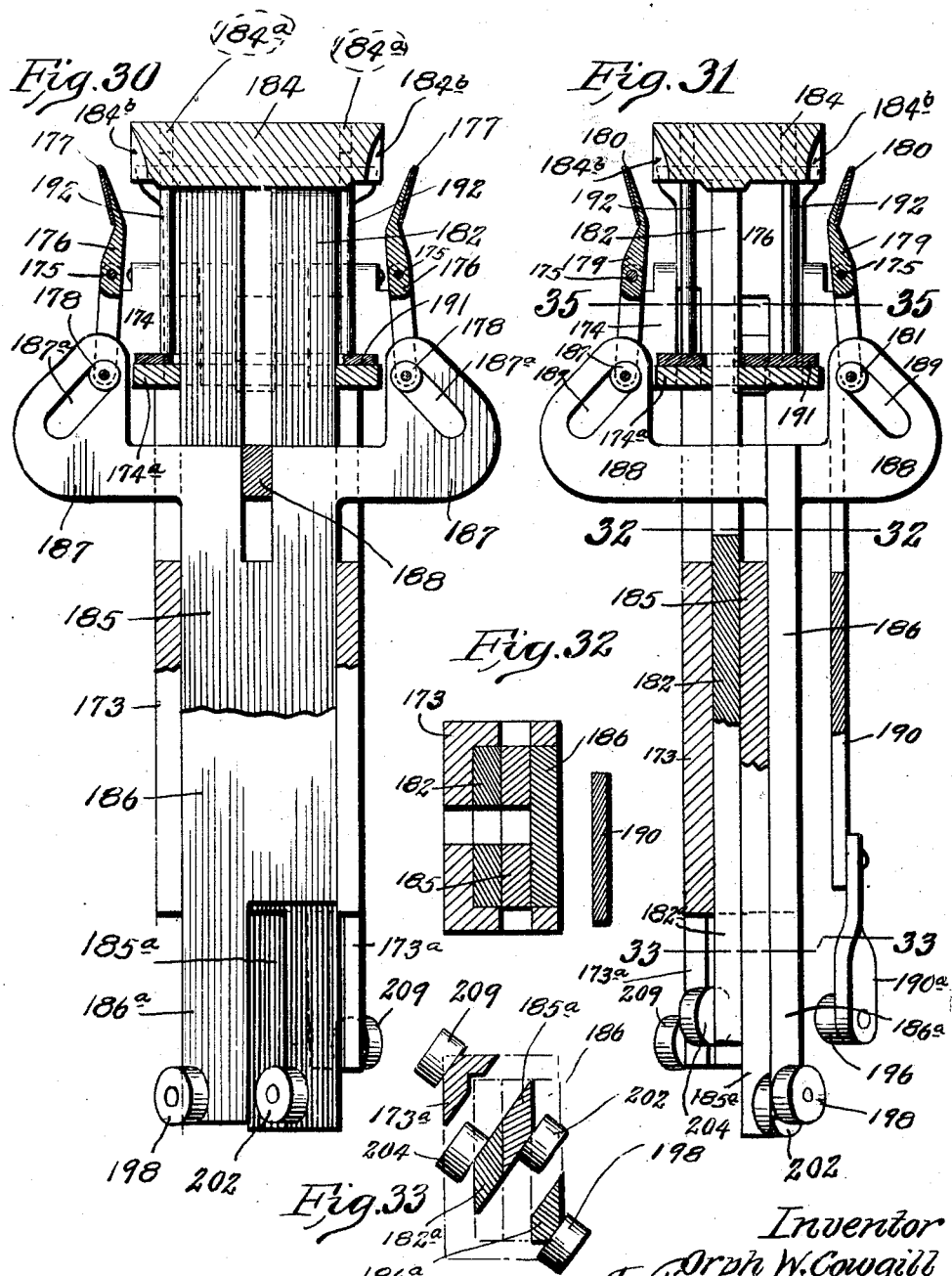

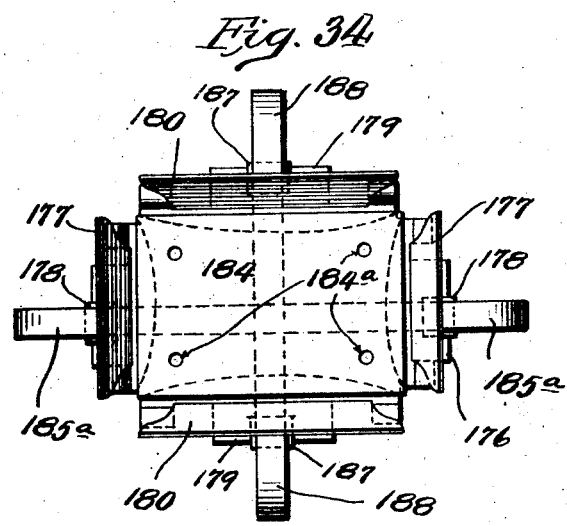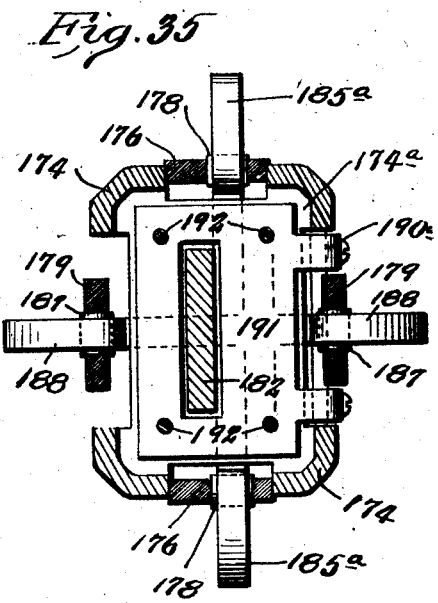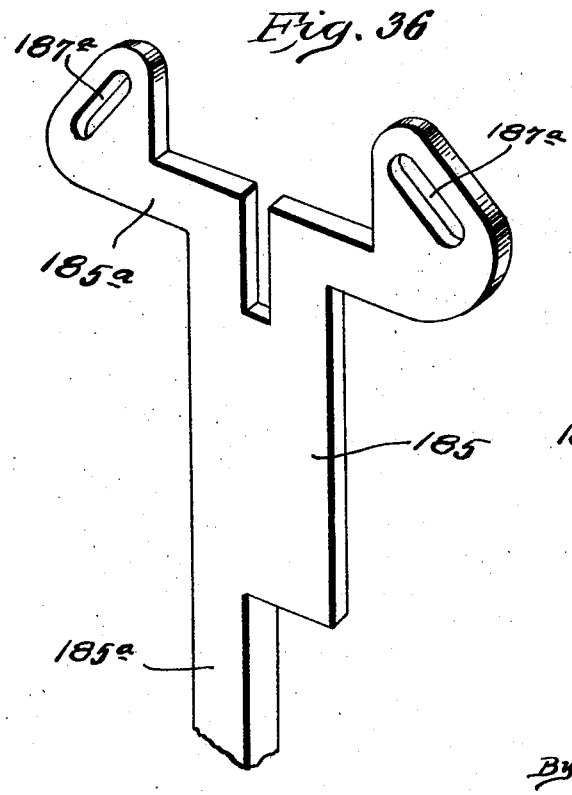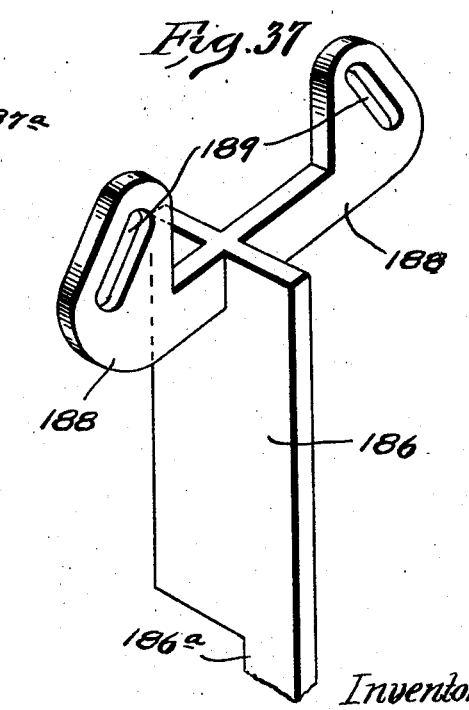

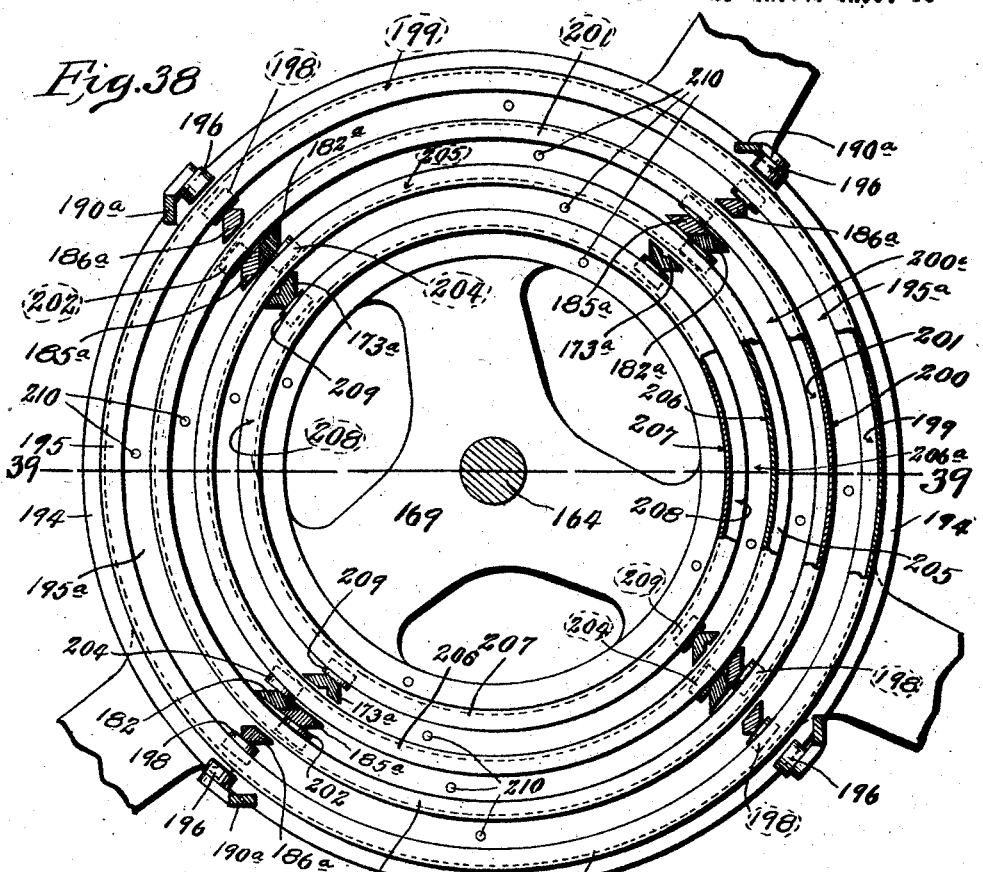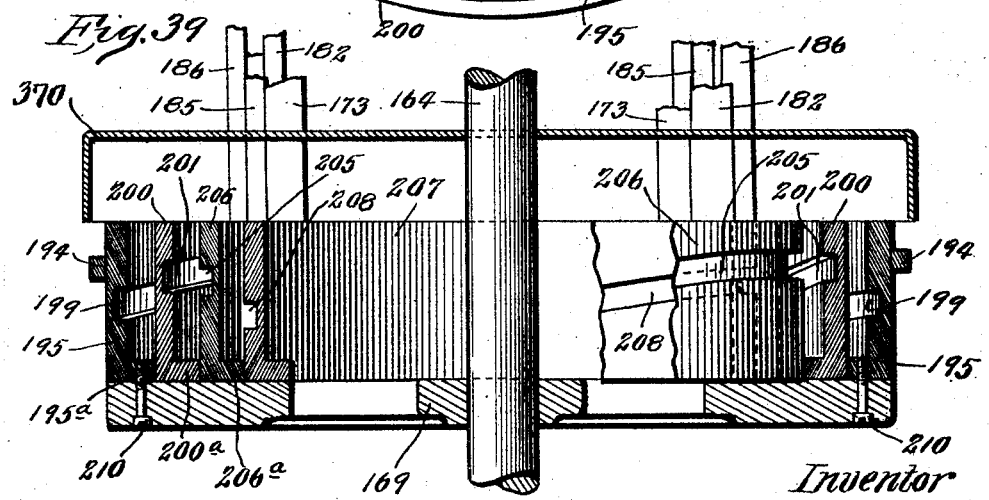

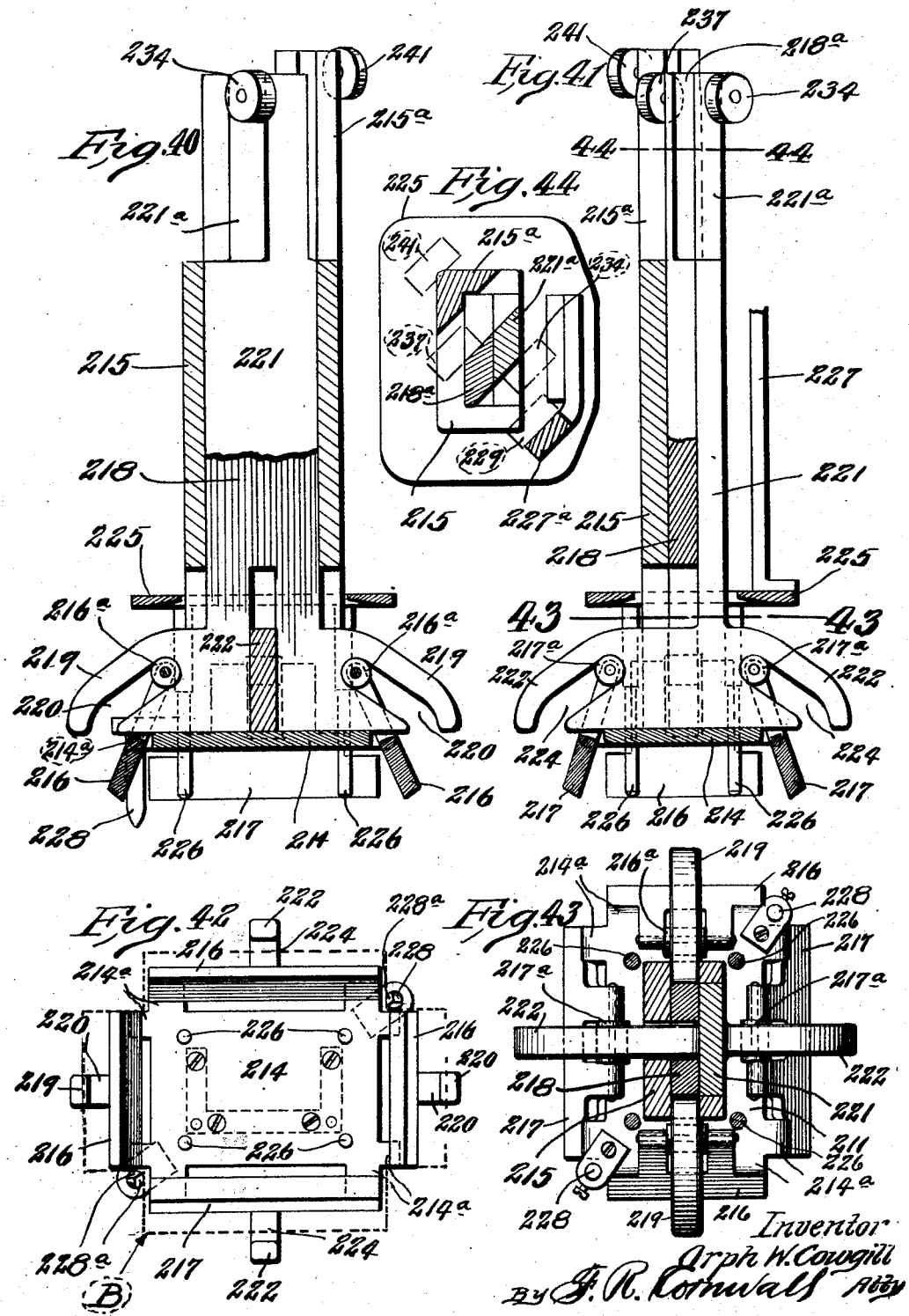

Aug. 25, 1925
O. W. COWGILL
BOX MAKING MACHINE
Filed Jan. 19, 1923    29 Sheets-Sheet 20
1,551,189
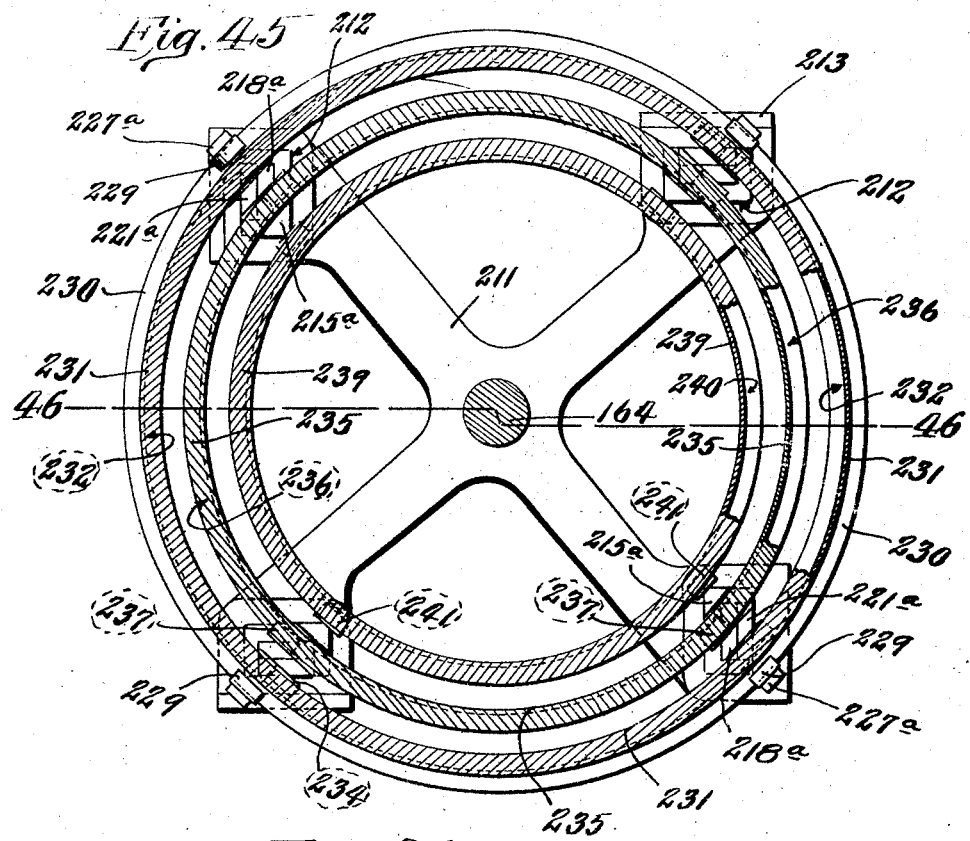
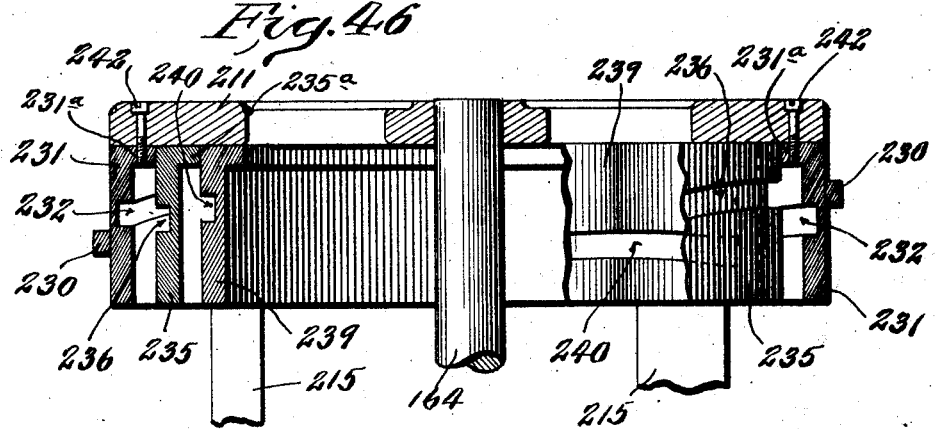
Inventor
Orph W. Cowgill
By F. R. Cornwall atty.

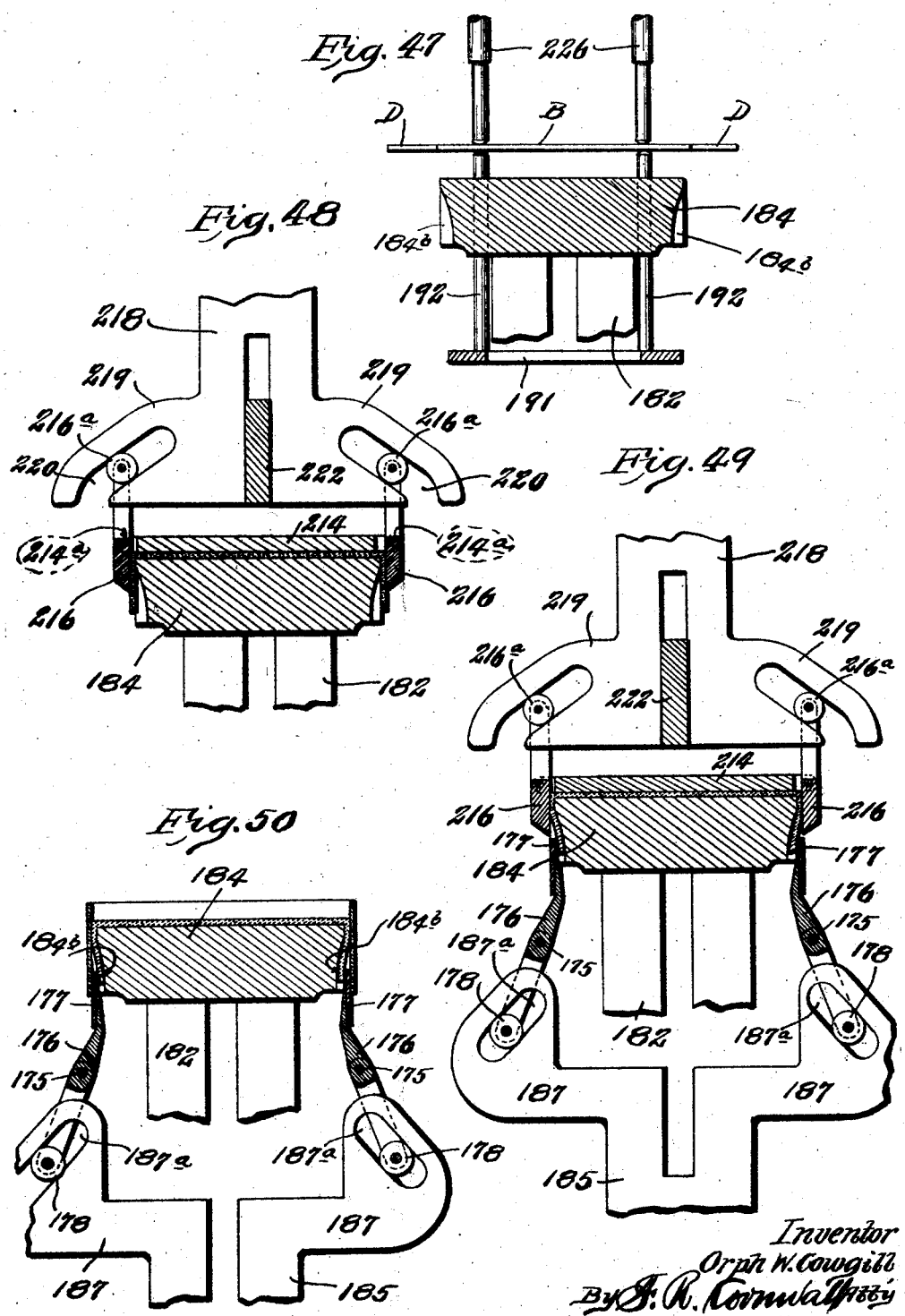

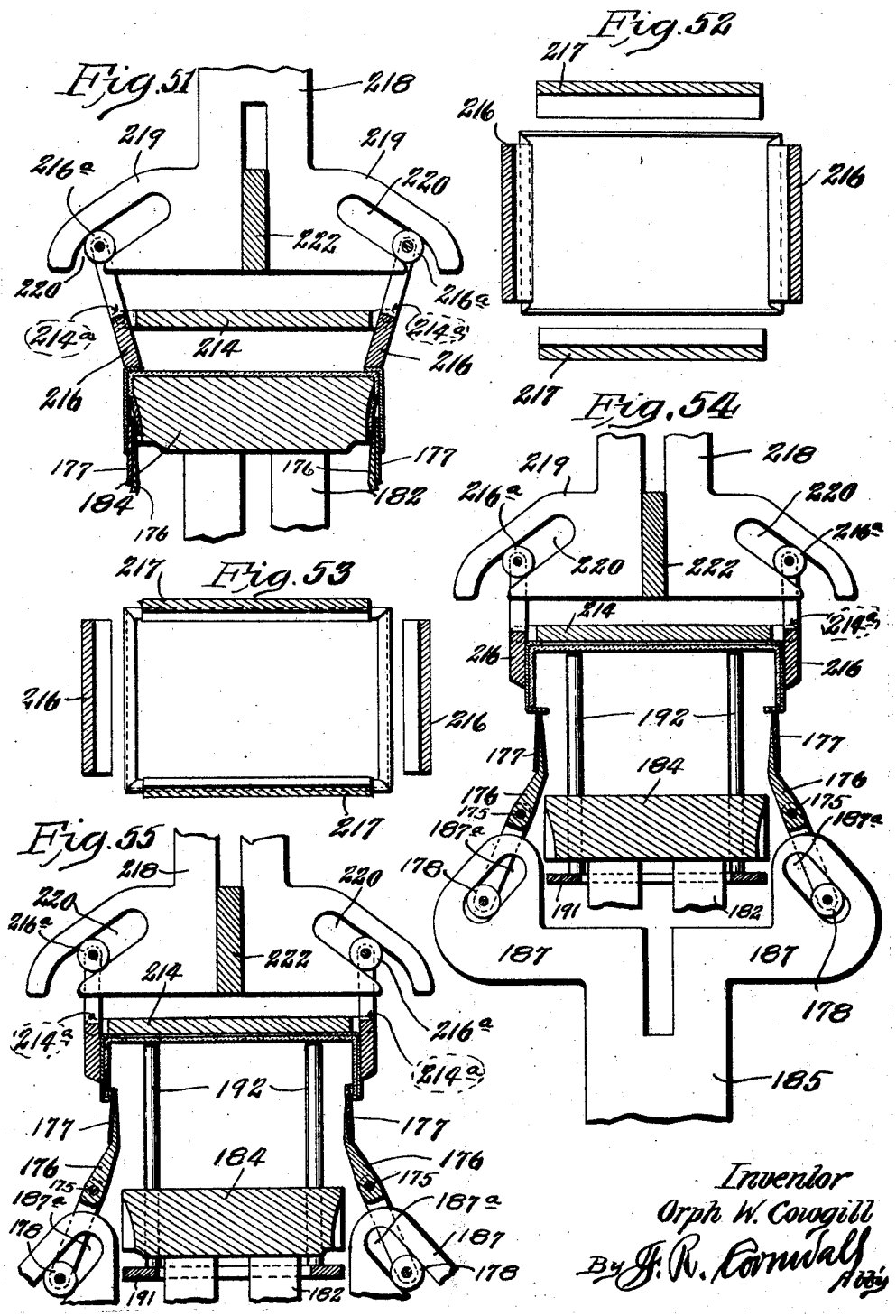

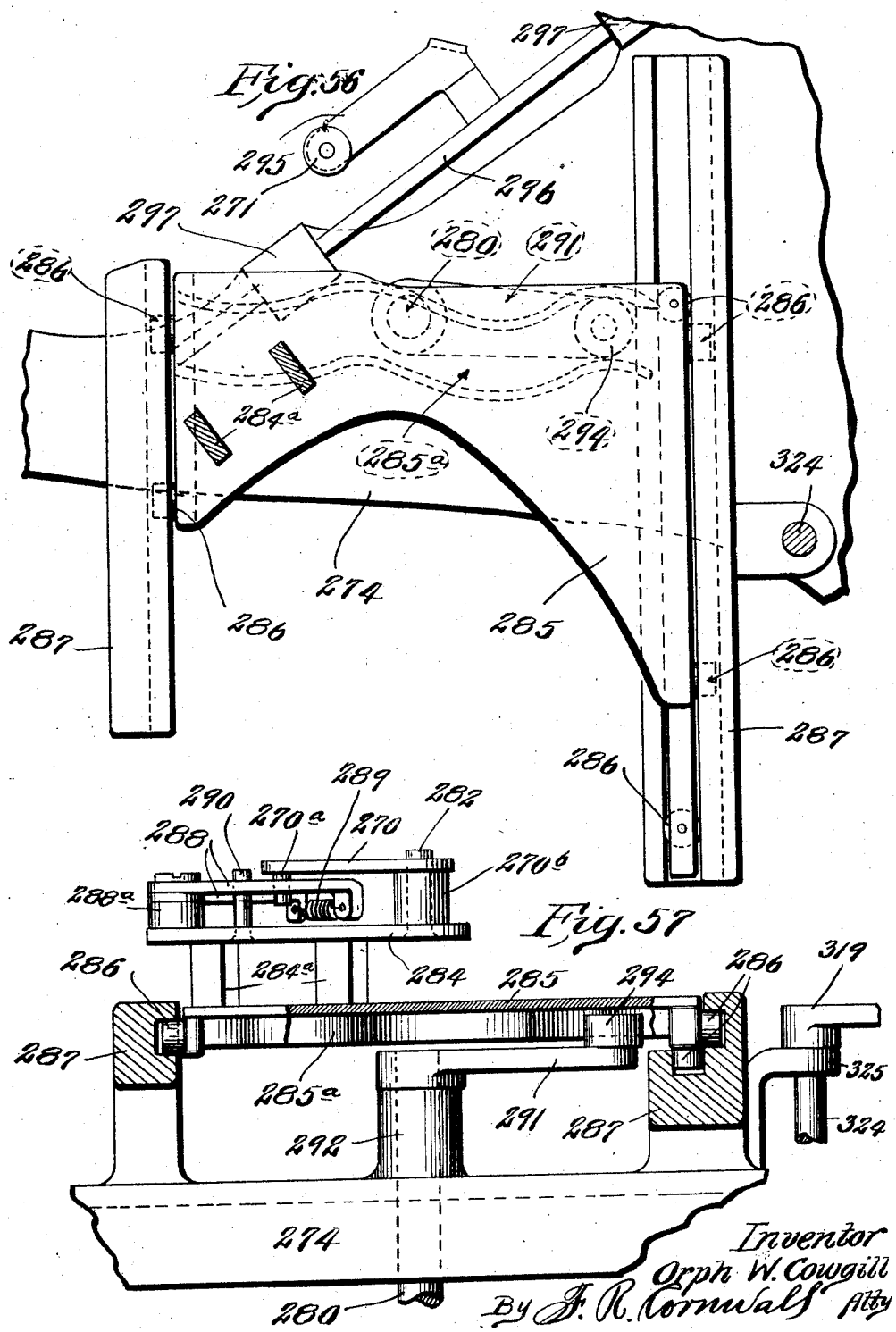

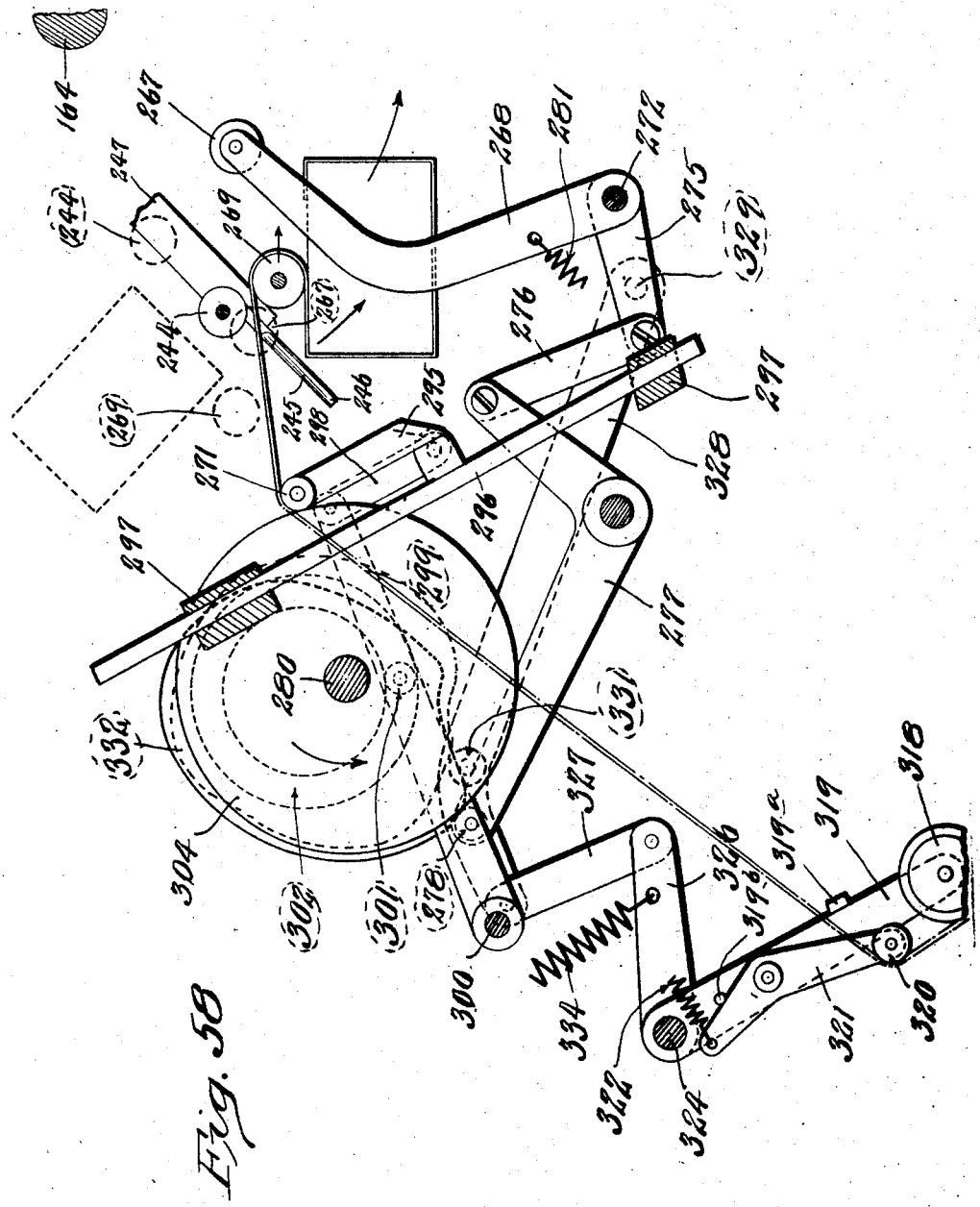

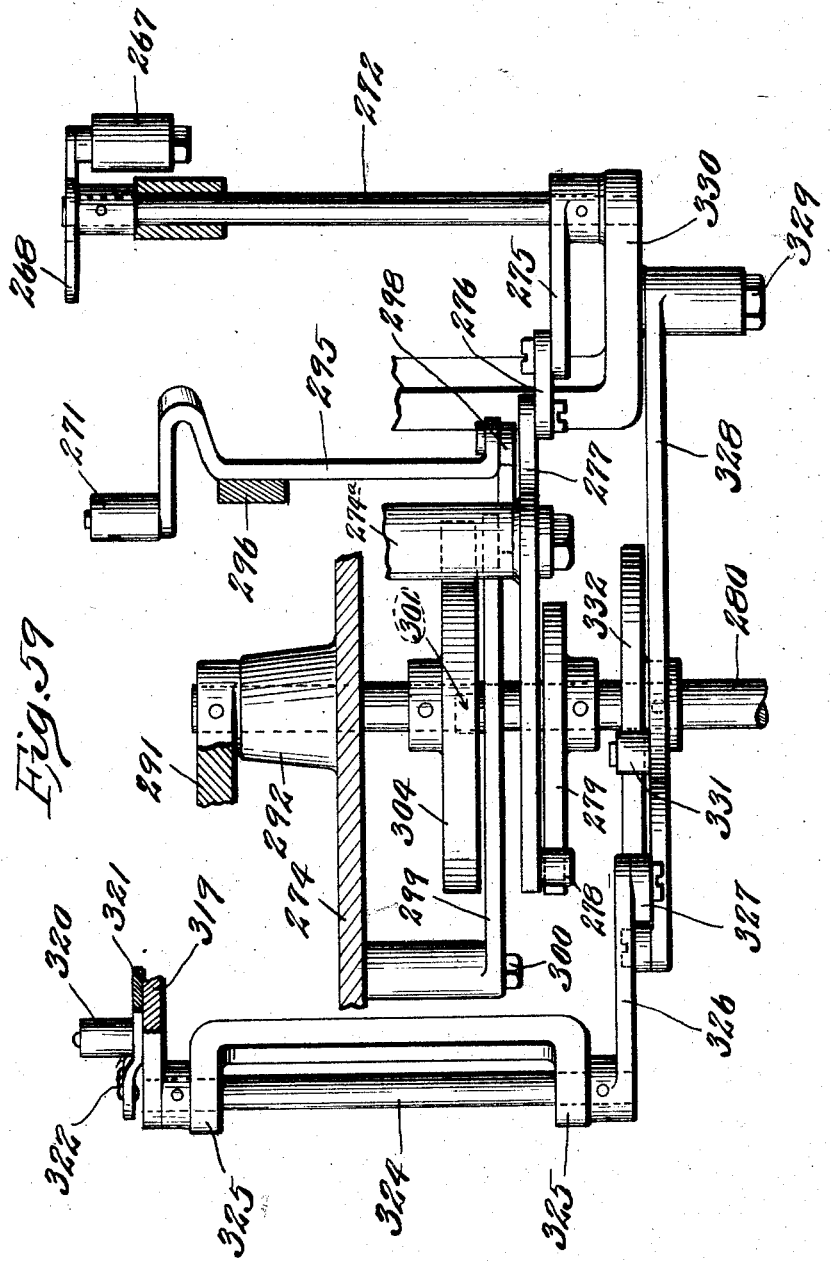

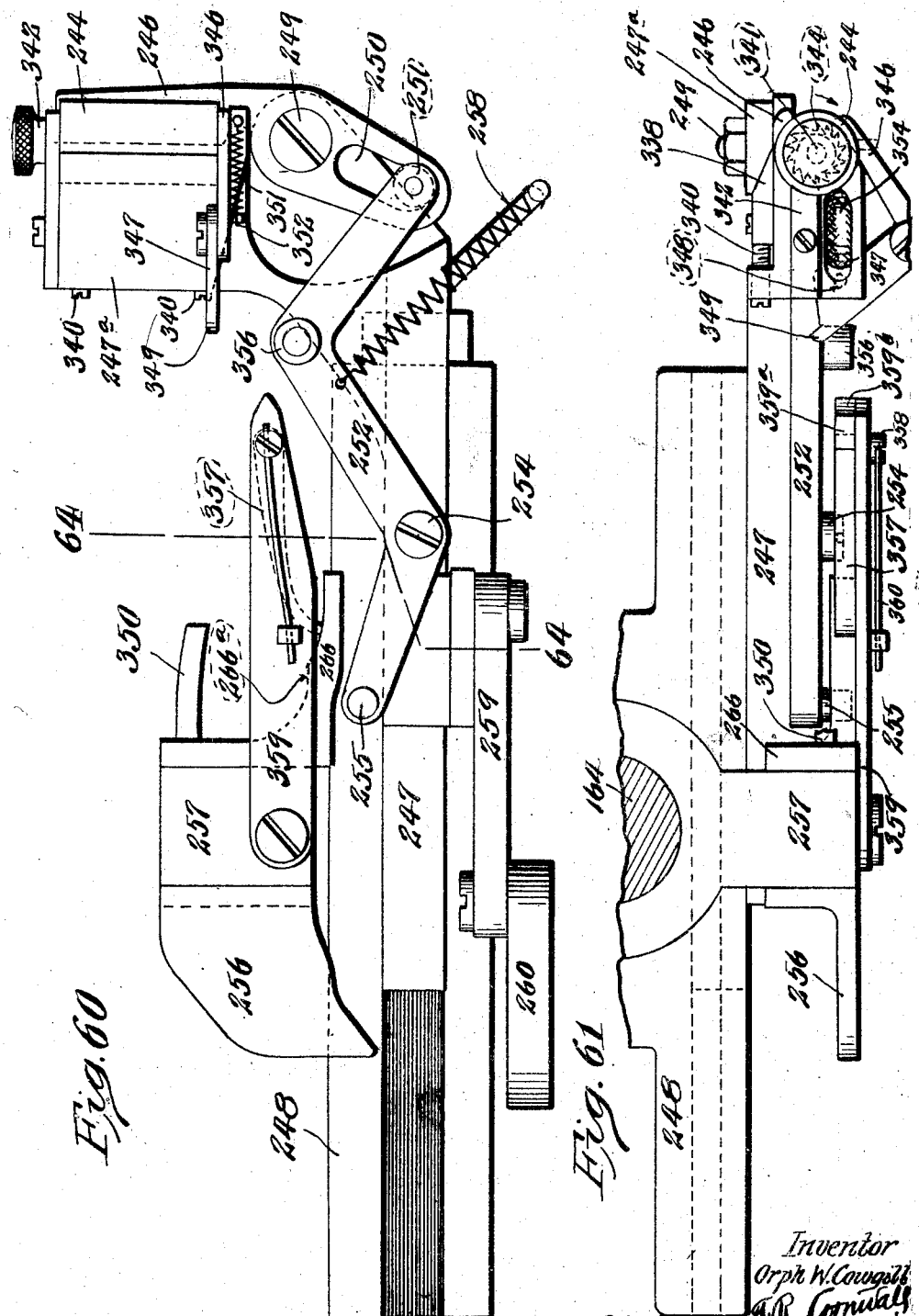

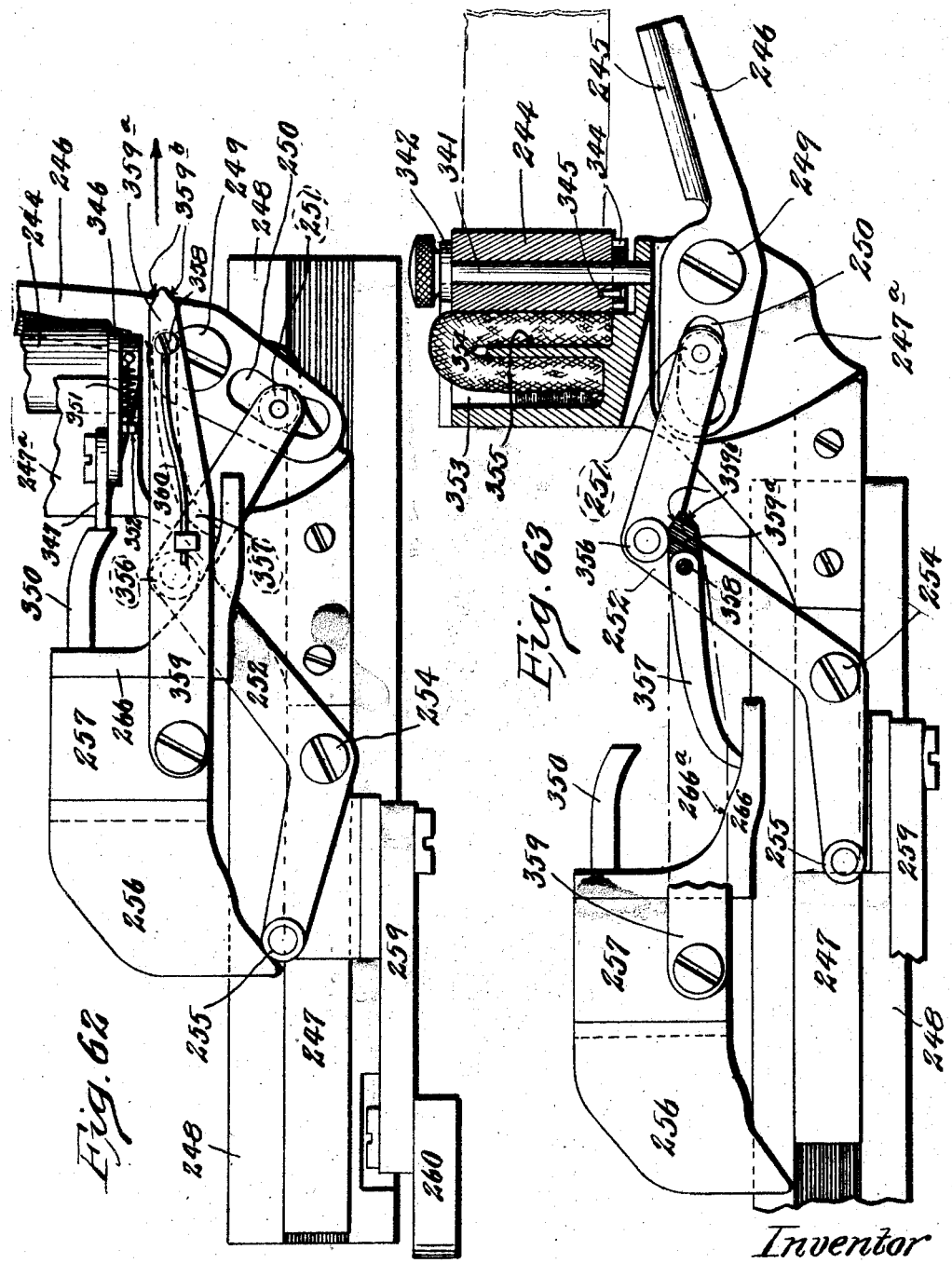

Aug. 25, 1925.
O. W. COWGILL
1,551,189
BOX MAKING MACHINE
Filed Jan. 19, 1923    29 Sheets-Sheet 28
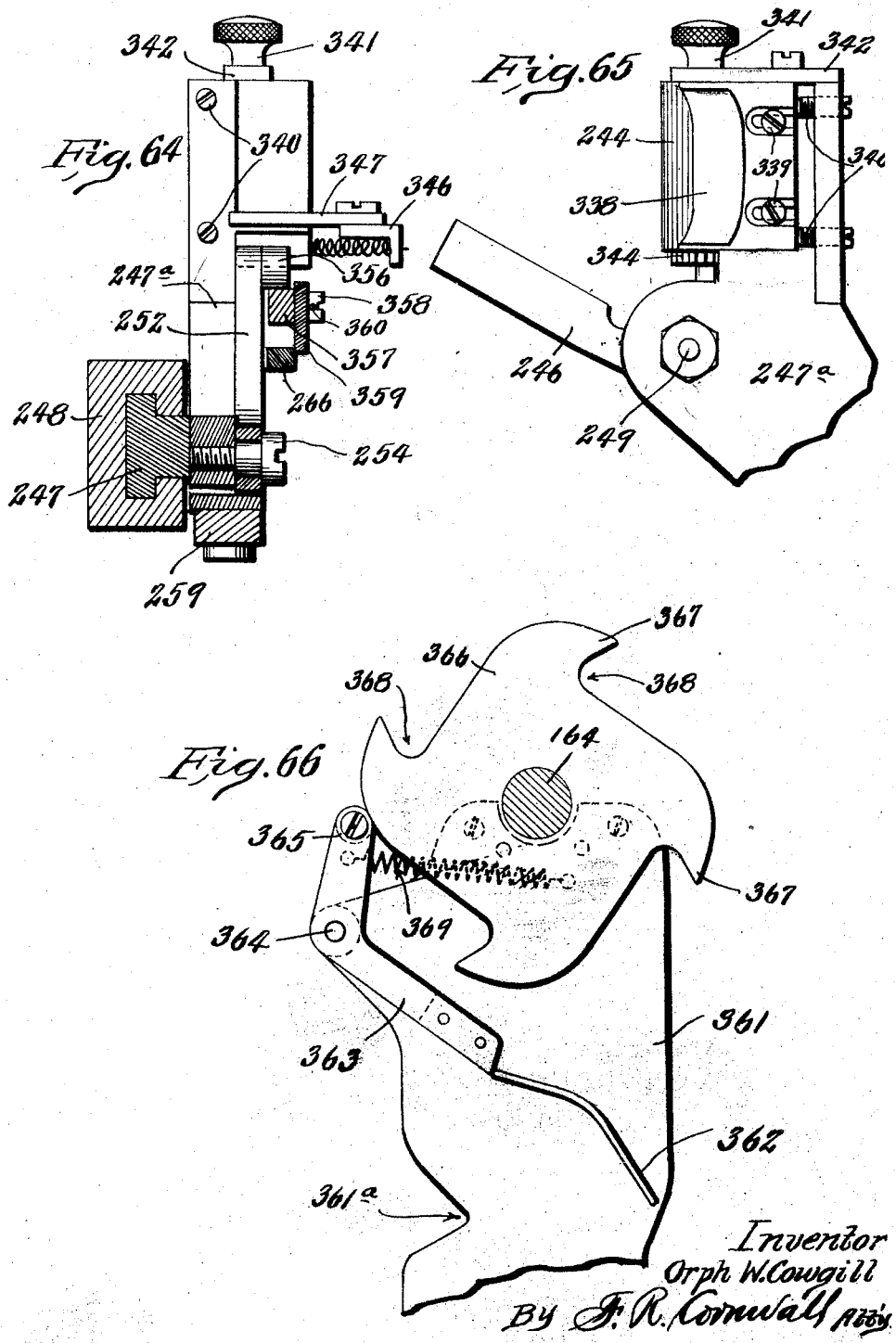

Aug. 25, 1925.
O. W. COWGILL
1,551,189
BOX MAKING MACHINE
Filed Jan. 19, 1923    29 Sheets-Sheet 29
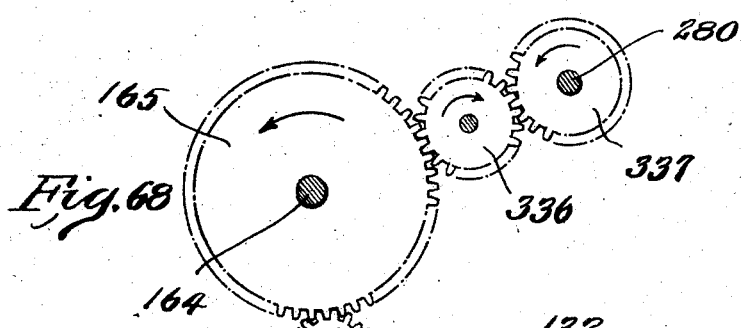
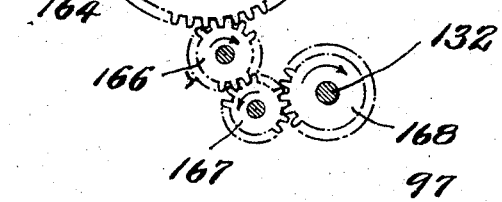
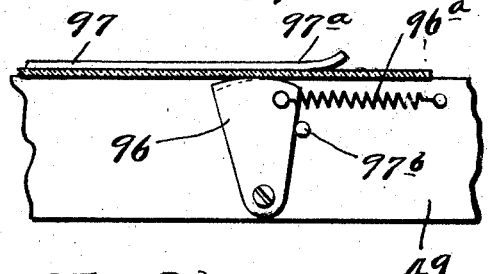
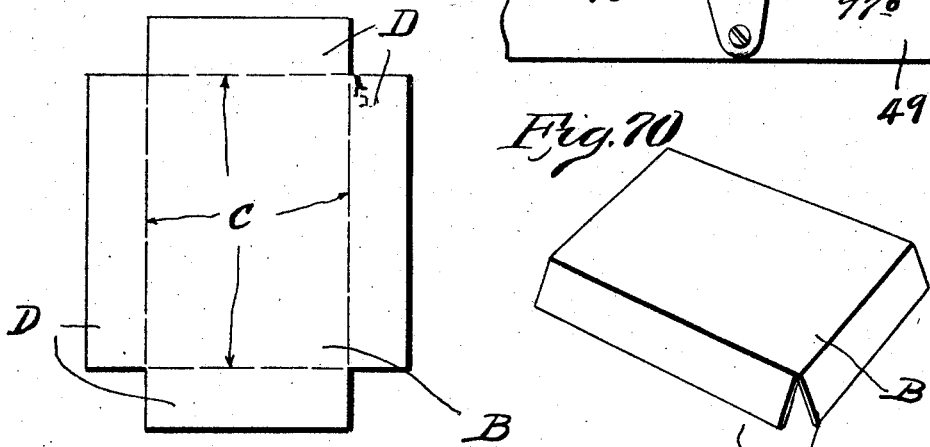
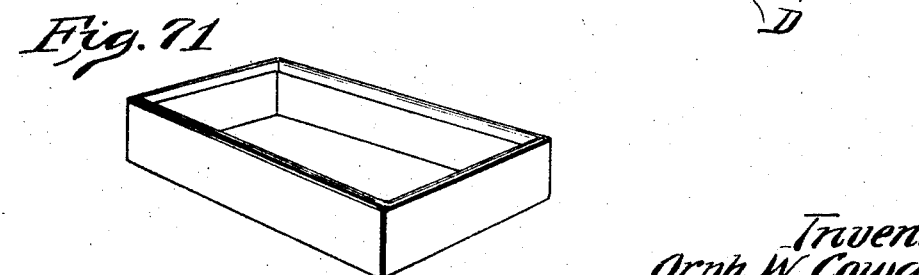
Inventor
Orph W. Cowgill
By J. R. Cornwall Atty.

Patented Aug. 25, 1925.

1,551,189

UNITED STATES PATENT OFFICE.

ORPH W. COWGILL, OF ST. LOUIS, MISSOURI, ASSIGNOR TO ST. LOUIS LABEL WORKS, OF ST. LOUIS, MISSOURI, A CORPORATION OF MISSOURI.

BOX-MAKING MACHINE.

Application filed January 19, 1923. Serial No. 613,632.

*To all whom it may concern:*

Be it known that I, ORPH W. COWGILL, a citizen of the United States, residing at the city of St. Louis and State of Missouri, have invented a certain new and useful Improvement in Box-Making Machines, of which the following is a full, clear, and exact description, such as will enable others skilled in the art to which it appertains to make and use the same, reference being had to the accompanying drawings, forming part of this application.

This invention relates to new and useful improvements in box making machines, and the objects of the invention are to provide a machine of the class described which is automatic in its action and highly efficient in operation.

Further objects of the invention are to provide a machine which is adapted to receive a strip of material from which a box is to be made and to automatically feed said strip at proper intervals to a blanking and scoring mechanism, then transfer the blank to a folding mechanism wherein the blank is folded in the form of a box, and a band applied with suitable adhesive to the side walls of the box.

Further objects of the invention are to provide means for feeding the band to the folding mechanism and applying glue to said band, and to provide means for cutting the band at the proper moment.

Still further objects of the invention are to provide mechanism for applying the band to the box and for turning the projecting edges of said band inwardly against the walls of said box, and to provide means for retaining the box in position while it is being operated upon and adapted to discharge said box when finished.

Still further objects of the invention are to combine a blank-cutting and scoring mechanism with a blank folding mechanism whereby the blank is automatically transferred to the folding mechanism, and to provide means for automatically feeding the material to said blank cutting and scoring mechanism, thus greatly increasing the output of the machines of the class described.

With these and other objects in view, my invention consists in certain novel features of construction and arrangements of parts hereinafter more fully described and claimed, and illustrated in the accompanying drawings, in which—

Figure 4 is an end view, partly broken away, of the forward end of the machine.

Figure 5 is a rear elevational view illustrating the travel of the band.

Figure 6 is a fragmental cross-section taken longitudinally through the forward end of the machine.

Figure 7 is a detail view showing the front elevation of the tripping mechanism used for controlling the strip positioning means.

Figure 8 is a detail view of the operating connections for raising the strip engaging finger of the tripping means.

Figure 9 is a rear view of the tripping mechanism showing said mechanism in inoperative or disabled position.

Figure 10 is a similar view showing the tripping mechanism in engagement with the strip-positioning means.

Figure 11 illustrates perspective detail views of the tripping mechanism.

Figure 12 is a detail view of the strip engaging finger.

Figure 13 is a detail view showing the finger moving into an operative position.

Figure 14 is a vertical cross section taken transversely through the strip supplying portion of the machine.

Figure 15 is a cross sectional view of the strip positioning means.

Figure 16 is a similar view showing a strip positioned on the carriage.

Figure 17 is a cross section taken longitudinally through the carriage.

Figure 18 is a detail view showing the strip gripping means of the carriage.

Figure 19 is a perspective detail view of the gripping means and its operating connections.

Figure 20 is a detail view of the die or blanking mechanism and parts associated therewith.

Figure 21 is a detail view showing the waste removing means moved into an open or discharging position.

Figure 22 is a plan view of the blank transferring means.

Figure 23 is a vertical cross section taken on the line 23—23 of Figure 22, and showing the transferring means in a blank engaging position.

Figure 24 is a similar view showing said transferring means actuated to release a blank.

Figure 25 is a view looking against the underside of said blank transferring means.

Figure 26 is a horizontal cross-section taken on line 26—26 of Figure 23.

Figure 27 is a perspective detail view of the mechanism utilized to operate said blank transferring means.

Figure 28 is a front elevational view of the folding mechanism of the machine.

Figure 29 is a horizontal section taken on line 29—29 of Figure 28.

Figure 30 is a vertical cross section taken through the lower half of one of the folding sections.

Figure 31 is a vertical section taken at right angles to Figure 30.

Figure 32 is a horizontal section taken on line 32—32 of Figure 31.

Figure 33 is a horizontal cross section taken on line 33—33 of Figure 31.

Figure 34 is a plan view of the parts shown in Figure 30.

Figure 35 is a horizontal cross section taken on line 35—35 of Figure 31.

Figure 36 is a perspective detail view of one of the actuator members.

Figure 37 is a perspective detail view of the other of the actuator members.

Figure 38 is a horizontal cross section taken on line 38—38 of Figure 28 and showing means for actuating the lower halves of the folding sections.

Figure 39 is a vertical cross section taken on line 39—39 of Figure 38.

Figure 40 is a cross sectional view taken through the upper half of the folding sections.

Figure 41 is a vertical cross-section taken at right angles to Figure 40.

Figure 42 is a plan view looking against the underside of the folding section.

Figure 43 is a horizontal cross section taken on line 43—43 of Figure 41.

Figure 44 is a horizontal cross section taken on line 44—44 of Figure 41.

Figure 45 is a horizontal cross section taken on line 45—45 of Figure 28 and showing the means for actuating the upper halves of the folding sections.

Figure 46 is a vertical cross section taken on line 46—46 of Figure 45.

Figure 47 is a cross sectional detail view of one of the folding sections and showing the blank in position thereon ready for the folding operation.

Figure 48 is a detail view showing portions of the blank bent downwardly to form the side walls of the box.

Figure 49 shows the upper half of the section receding from the blank, and illustrates how the bent portions of the blank are held in their positions in readiness to receive the band.

Figure 50 shows the band applied to the side walls of the formed blank.

Figure 51 illustrates the method of pressing the upper projecting edges of the band against the bottom wall of the box.

Figures 52 and 53 are plan views illustrating the successive stages in applying the upper edges of the bands to the box.

Figures 54 and 55 illustrate two stages in folding the lower edges of the band against the inner faces of the side walls of the box.

Figure 56 is a plan view of the band engaging carriage and parts associated therewith.

Figure 57 is an end elevation of the same.

Figure 58 is a plan view of the mechanism designed to apply the band to the box.

Figure 59 is a side elevational view of the same.

Figure 60 is a front elevation of the band severing mechanism.

Figure 61 is a plan view of same.

Figure 62 shows the severing mechanism moved to its extreme inner position.

Figure 63 shows the severing mechanism moved outwardly in readiness for the cutting operation.

Figure 64 is a detail view taken on line 64—64 of Figure 60.

Figure 65 is a rear elevational view of the band cutting and gripping means.

Figure 66 is a plan view of the box discharging means.

Figure 67 is a detail view of means utilized for feeding the strip of material forward to the blanking mechanism.

Figure 68 shows the train of gearing used to drive the rotor shaft and the cam shaft.

Figure 69 is a plan view of the blank.

Figure 70 is a perspective view of the folded blank before the band is applied.

Figure 71 is a perspective view of the finished box.

Figure 1:
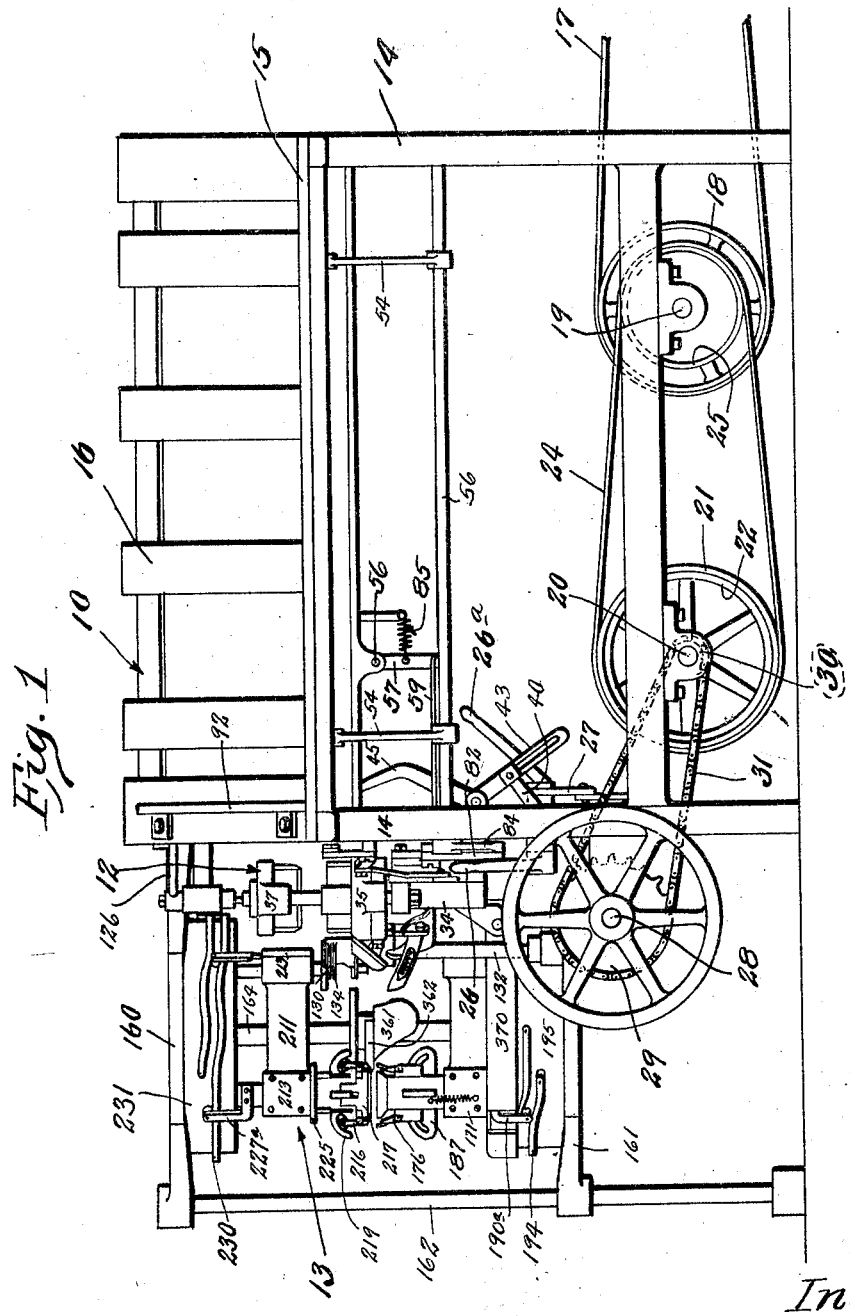
Figure 1 is a front elevation of the machine.
Figure 2:
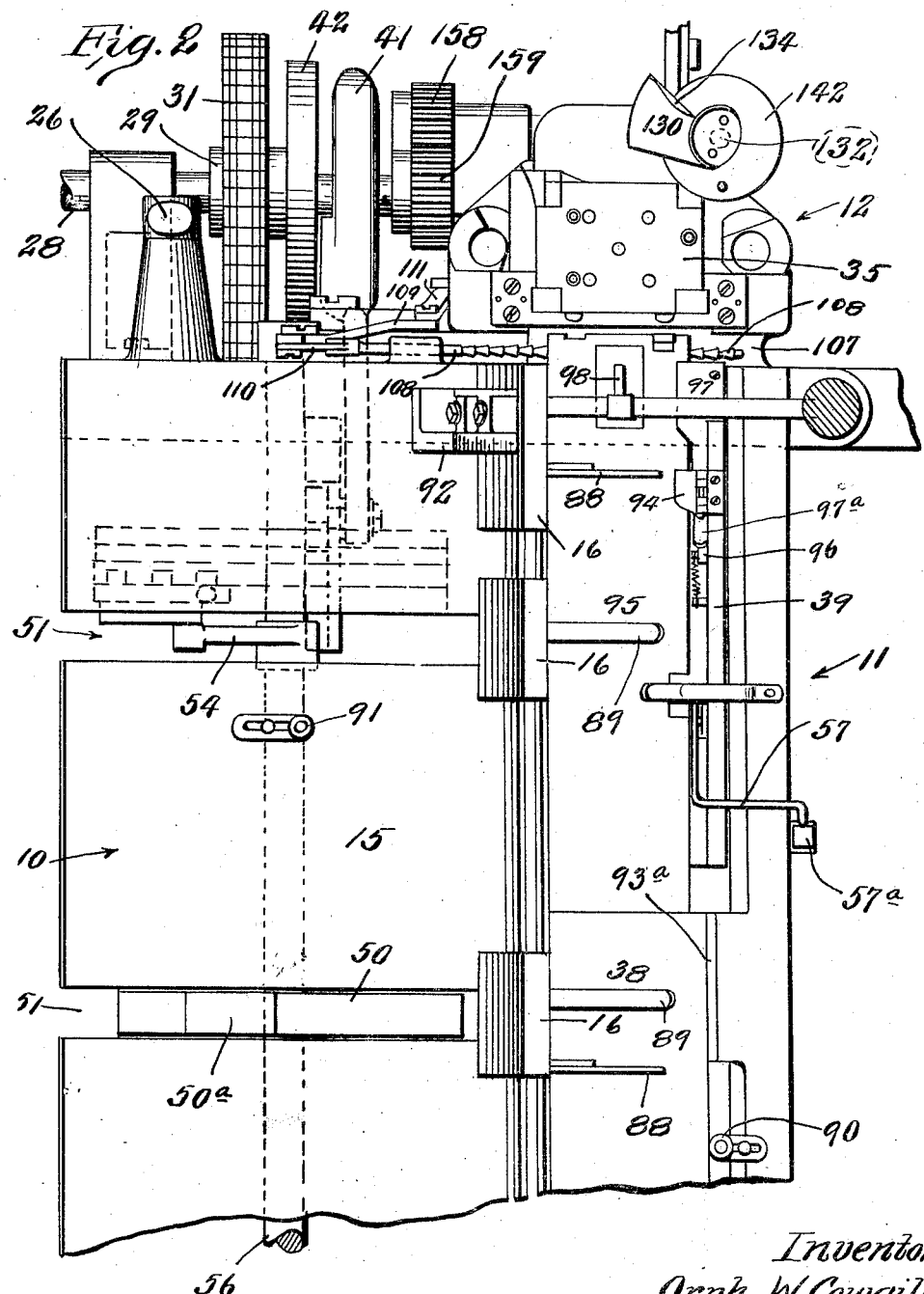
Figure 2 is a plan view of the forward portion of the machine.

The invention contemplates a machine in which the strip of material is fed to a die which cuts out and scores a blank, which blank is then transferred to a folding mechanism wherein the blank is folded into the proper shape and a finishing or binding band is applied to the side walls of the box. Generally speaking, the machine consists of four sections, viz, the material supporting and feeding section 10; the strip positioning section 11; the blank cutting section 12; and the blank folding and band applying section 13.

The material supporting and feeding section 10 comprises frames 14, which support a table 15, the latter sloping rearwardly toward the blank or strip positioning section 11. Projecting upwardly from this table is a wall 16 preferably formed of upwardly extending slats which are spaced from each other and are supported on a suitable framework secured to frames 14.

The machine is actuated by an electric motor (not shown) through the medium of a belt 17 which passes over a pulley 18 fixed to shaft 19. This shaft is journaled in suitable bearings carried by the lower portion of frame 14. A shaft 20 is journaled in the forward end of frame 14 and carries a pulley 21 in which is arranged a clutch 22, whereby pulley 21 may be engaged or disengaged from shaft 20. A pulley 25 is fixed to shaft 19 and passing over this pulley and driving pulley 21 is a belt 24. Clutch 22 is controlled by a handle 26 arranged in the front end of the machine and a handle 26ª projecting rearwardly towards the blank feeding mechanism 11, thus enabling the operator to control the machine from either side. Suitable operating connections 27 connect said handles with clutch 22.

The shaft 28 is transversely journaled in bearings projecting outwardly from the forward end frame 14 and has fixed thereon a large sprocket wheel 29. Shaft 20 has fixed thereon a small sprocket wheel 30, and operating over these wheels and driving shaft 28 is a sprocket chain 31.

The rear or inner end of shaft 28 terminates below the blanking mechanism 12 and has fixed thereon a crank arm 32 to which is pivotally connected the lower end of an adjustable connecting rod 33, the upper end of which is pivotally mounted in the lower end of a casting 34. A stationary die member 35 is supported on the forward end of frame 14 above the casting 34 and projecting upwardly from this casting and passing through said stationary member 35 are posts 36, the upper ends of which carry a movable die member 37, which is designed to co-operate with the stationary member 35 and is operated from shaft 28 through the connections just described.

The strip or blank positioning section 12 consists of a shelf 38 which extends outwardly and rearwardly from table 15, and on the same horizontal plane with the stationary member 35. Movably mounted in the forward end of this shelf is a reciprocating carriage 39. This carriage is operated from shaft 28 through the medium of an arm 40 loosely mounted on said shaft and having a roller 41 operating in the cam race of a cam 42, which is fixed to shaft 28. The upper end of arm 40 is adjustably secured to the slotted end of arm 43 by suitable fastening means 43ª and imparts a rocking motion to a shaft 44. This shaft is journaled in suitable bearings projecting inwardly from the forward end frame 14, and has fixed thereon an upwardly extending arm 45, the upper end of which is pivotally connected to the free end of a link 46, which latter is carried by a rod 47. This rod is transversely arranged in the forward end of carriage 39 and has its ends fixed in arms 48, which latter are pivotally mounted on the inner sides of carriage frame 49. Frame 49 has laterally projecting rollers which operate in suitable raceways formed in the inner sides of shelf 38 and downwardly presented rollers which hold the carriage in proper alignment. Shelf 38 is designed to receive the strip of material and carriage 39 is arranged to feed it intermittently toward the blank cutting mechanism 12.

Where the material is supplied in the form of a series of strips, the strips are stacked on table 15 in parallel with shelf 38, and suitable means is provided for moving the lowermost strip laterally from the stack onto the shelf.

The means for positioning the strips on the shelf consists of a series of bars 50 operating in slots 51 formed transversely in table 15. Each of these bars has a shoulder 50ª formed thereon which extends upwardly beyond the upper surface of table 15 a sufficient distance to engage, during the rearward movement of said bars, the forward edge of the lowermost strip and push it from under the stack of the remaining strips onto the shelf 38. The lower ends of the slats 16 terminate above table 15 a proper distance to provide clearance for the passage of single strips. Bars 50 which are secured at their outer ends to a longitudinally disposed iron 52, are supported by rollers 53 which ride in tracks formed in the sides of transverse members supported on frames 14. These bars are operated by means of arms 54 with which they are connected by links 55 and said arms are fixed to a shaft 56 longitudinally mounted in frame 14 and below table 15, which shaft is designed to be actuated when the strip located on shelf 38 reaches a predetermined position thereon in its forward movement toward the blanking mechanism. The strip positioning bars 50 and shaft 56 are set in operation by a finger 57 carried by an arm 57ª which is fixed to a shaft 58, the latter being journaled below the shelf 38, and said finger projects upwardly above said shelf and is adapted to have its extreme end rest on the strip of material located on said shelf. The opposite end of shaft 58 extends toward table 15 and carries a depending arm 59. The lower end of this arm has a laterally projecting pin 60 to which is connected the rear end of a horizontally disposed bar 61, the forward end of which projects outwardly through the forward end frame 14 and has mounted thereon a roller 62. This roller is adapted to operate in an open ended slot 63 formed in a wing piece 64 which is fixed to and projects rearwardly from casting 34.

Arranged parallel with bar 61 is a rod 65 having a slotted rear end 65ª engaging pin 60. The forward end of this rod carries a roller 66 which normally rides on the edge of a pivotal piece 67. This pivotal piece 67 is pivotally mounted on a bolt 68 which projects rearwardly from the rear wall of casting 34. Pivotally mounted on the same pin or bolt 68 adjacent to the rear wall of said casting is a rocking bar 69 which projects below the pivotal piece 67 and carries at its extreme lower end a laterally projecting pin 70. A plate 71 is stationarily mounted on the forward end of frame 14 below and rearwardly of casting 34 and projects upwardly into the path of pin 70. This plate is designed to engage, during the downward or operative movement of casting 34 and members 67 and 69, pin 70 and lock bar 69 in position. When bar 69 occupies a disengaged position, pin 70 rides on the rear edge of plate 71, as shown in Figure 9, and when bar 69 occupies an actuating position, said pin engages the forward end of plate 71, as shown in Figure 10.

Projecting laterally from piece 67 is a pin 72 which rests in a notch 74 formed in the edge of bar 69. Piece 67 and bar 69 are provided at their upper ends with oppositely disposed projections to which are secured the ends of a spring 75 which tends to draw said piece and bar together whereby pin 72 engages notch 74. Another spring 76 is connected near one end to the upper end of bar 69 and at its opposite end to casting 38 so that the interengaged members 67 and 69 are held under spring tension against roller 66 and as soon as this roller is retracted from its position, said members swing on pivot 68 into the strip positioning engagement.

The engagement is accomplished by means of a notch 77 formed in the forward edge of member 69, which notch, when members 67 and 69 swing forwardly, is moved into a position to engage a pin 78 projecting laterally from an arm 79. One end of this arm is pivotally secured to frame 14, as at 80, and its opposite or free end has a pivotal connection 81 with one end of a link 82. The opposite end of this link has a pivotal connection with the lower end of an arm 84 secured to and depending from shaft 56. Arm 79 and link 82 are angularly disposed relative to each other to form toggle mechanism and are under normal conditions inoperative, but when members 67 and 69 are displaced by the widthdrawal of roller 66, slot 77 during the downward movement of said members and casting 34 engages pin 78 and actuates arm 79 and link 82, thereby causing arm 84 to rock so that shaft 56 and the strip positioning arms 54 and bars 50 are actuated.

Finger 57 is held downwardly against the strip of material on carriage 39 by means of a spring 85 which is anchored at one end to frame 14 and at its other end to arm 59. Roller 66 is held in its forward or disabled position by a spring 86 which is secured at one end to bar 65 and at its other end to frame 14. This spring, which is weaker than spring 85, maintains bar 65 in its extreme forward position so that pin 60 occupies the extreme rear end of slot 65ª, and when finger 57 moves downwardly and arm 59 rocks rearwardly, bar 61 and rod 65 are actuated. Slotted wing piece 64 carried by the movable casting 34 actuates through bar 61, finger 57 whereby the latter is lifted and moved way from shelf 38 whenever a strip is being positioned on the shelf by bars 50 so that the finger does not interfere with the placing of the strip on said shelf. This finger is also raised when the strip is being fed forward to the blanking machine, so that all danger of the strip being retarded by pressure exerted by said finger is removed. This operation of bar 61 does not affect bar 65 and roller 66 on account of the slot and pin interengagement of arm 59 and bar 65.

Roller 66 is not retracted past pivotal member 67 but only a sufficient distance to clear the edge 67ª, there being a portion removed from the rear side of said member to form a recess 67ᵇ which provides a sufficient clearance between said roller and said member when the latter occupies a displaced position. Recess 67ᵇ is formed with a cam face 87 upon which, during the downward movement of casting 34 and members 67 and 69, roller 66 rides, causing member 67 to be gradually swung rearwardly to its normal position. Upon reaching the upper end of cam 87 roller 66 and bar 65 are allowed to move forwardly under the influence of spring 86 to their normal positions. The forward movement of bar 65 is limited by a shoulder formed thereon and engaging frame 14. The restoring movement of member 67 independently of member 69 is rendered possible by the slot-and-pin connection 72 and 74, respectively. Member 69 is restored by spring 75 the tension of which has been increased by the restoration of member 67 and this home movement of member 69 takes place as soon as pin 70 leaves the upper end of plate 71 and the notched portion 77 of member 69 is relieved of the pressure created by the operative engagement of pin 78 and portion 77, Normally, pressure produced in actuating arm 79 is sufficient to retain member 69 in engagement with pin 78 of arm 79, and the locking plate 71 is used to insure the operative connection and prevent accidental disengagement of arm 79 and member 69 as, for example, where the machine is stopped while the member 69 is still in engagement with pin 78 after member 67 has been restored. As there would be no pressure exerted upon member 69 by pin 78, said member would be restored by the tensioned spring 75 before the completion of the operation of the machine. By utilizing locking plate 71, the danger of this is eliminated. When member 69 moves to its home position, notch 77 is moved out of engagement with pin 78 of arm 79 thereby disabling the strip positioning mechanism.

Pivotally mounted on and projecting outwardly and rearwardly from slots 16 are a series of pendants 88 which are designed to rest on and hold the strip of material to the shelf 38. A series of plates 89 are secured to and project rearwardly from slats 16 and bear on top of each strip and prevent it from being moved out of engagement with shoulders 50$^a$ after said strip has been moved from the stack of strips, thus insuring the strips being carried against stops 93 and 93$^a$. Upwardly presented cone-shaped pins 90 are adjustably mounted on shelf 38 and assist in properly positioning the strips thereon. Similar cone-shaped pins 91 are adjustably arranged on table 15 for maintaining in proper position the strips placed on the table. The first one of slats 16, which is located above the forward frame 14, has a guide 92 adjustably secured thereto and projecting forwardly therefrom, and forming a stop for the forward ends of the strips so that said strips, when they are stacked on the table 15, can be properly aligned with respect to carriage 39.

The rear side frame of carriage 39 is provided with an upwardly projecting portion 93 which forms a stop and limits the lateral movement of the strip when it is being placed on a frame of the shelf 38. After bars 50 have deposited a strip on shelf 38 they are retracted in readiness for another operation, the forward ends of shoulders 50$^a$ being rounded or tapered to enable the bars to pass under the stacked strips to their normal positions without disturbing said strips.

When a strip is placed in position on shelf 38 and carriage 39, its forward end rests on a plate 94 which is hinged to one of the side frames of carriage 39 adjacent to stop 93 and presses against the extension 95 on shelf 38. Immediately below strip 93 and hinged plate 94 is pivotally mounted a strip locking piece 96, the upper end of which is eccentric so as to engage the strip and feed it forward during the forward movement of the carriage and adapted to ride free of the underside of said strip when the carriage is moved rearwardly to its normal position. When carriage 39 is moved forward to feed the previously positioned strip to the blanking mechanism, the forward end of the new strip which is stationary, as it is not yet engaged by the carriage, drops onto table 95, or on top of the rear end of the old strip, and on the return or rearward movement of the carriage, hinged plate 94 rides over the forward end of the new strip, so that the latter can be engaged by the locking piece 96. A stationary plate 97 is fixed to one of the side frames of the carriage 39 forwardly of hinged plate 94 and has a rearward extension 97$^a$ which overlies the eccentric end of piece 96 and forms a rigid support between which and the free end of piece 96 the strip is gripped. This pivotal piece 96 is moved into this strip-engaging position by a spring 96$^a$ while the stop 97$^b$ prevents its excessive movement in the opposite direction. Thus, the strip is fed forward to the blanking mechanism 12 during the forward movement of the carriage 39 by the locking piece 96 and during the retrograde or rearward movement of the carriage the strip is held stationary by a spring pressed presser foot 98 pivotally mounted above the forward end of the extension 95 and arranged so as to allow the forward movement of the strip and hold said strip stationary against the fixed extension 95 while the carriage is being restored to its normal position.

In order to accurately hold the strip while it is being fed forwardly and particularly the short last portion thereof, the extreme forward end of the carriage is provided with strip gripping elements 99$^1$ pivotally mounted on the forward ends of the side frames of the carriage. One end of said gripping elements co-operates with and bears against the underside of the forward end of plate 97 and the other element co-operates with the underside of a plate 100 which is mounted on the corresponding forward end of the carriage frame 39. These gripping elements normally occupy disengaged positions, as shown in Figure 18, and when the carriage is moved forwardly said elements are automatically rocked on their pivots so that their forward ends are brought against their corresponding co-operating plates, as shown in Figure 17.

The movement of the elements 99 into the strip gripping positions is effected by forming on each element rearward extensions 99$^a$, which are pivotally connected to a forwardly presented lug 48$^a$ on the corresponding arm 48, and the movement of the elements 99 to engage the strip is accomplished immediately before carriage 39 starts on its forward movement, and said elements are moved into a disengaging position immediately before the carriage begins its rearward movement. Arms 48, through which carriage 39 is actuated by arm 45, are pivotally mounted on the side frames of the carriage and have a slight rocking movement relative thereto so that when arm 45 is actuated, said arms are rocked before carriage 39 is actuated. This slight rocking movement of arms 48 is designed to operate elements 99 causing them to move into engaging or disengaging position, as the case may be, before carriage 39 starts on its travel. The rocking movement of arms 48 is limited by pins 48$^b$ which are carried by and project inwardly from the side frames of the carriage and engage apertures formed in arms 48.

The blanking and scoring mechanism 12 (see Figures 4, 6 and 20) consists of a stationary die member 35 which is secured to and projects forwardly from the forward end of frame 14 and a movable die or punch member 37 located above and adapted to be moved into co-operative relation with member 35 when casting 34 is actuated, said movable die member being connected to said casting by posts 36.

Yieldingly mounted in movable die member 37 and projecting downwardly from its face are pins 105 which are designed to engage that portion of the strip positioned on the stationary die member 35 and hold it while said movable die member is being moved downwardly to cut and score said portion of the strip.

The scoring is done by scoring knives 106, which score the blank B (Figure 69) along the dotted lines C so that the marginal portion D may be folded to form the side and end walls of the box (Figure 70). After the blank is cut, part of the waste material or scrap falls into a trough 107 located rearwardly of and below the stationary die member 35 and the scrap is then discharged therefrom by a plunger 108 which traverses said trough and is actuated by a bellcrank 109 to which said plunger is connected by a short link 110. The bellcrank is pivotally mounted on frame 14 and receives its motion from casting 34 to which it is connected by a long link 111.

The blank is preferably cut on all sides at each operation in order to provide an accurate blank, thereby insuring the production of boxes which are identical in size and shape. The forward portion of the waste material is removed from the die by co-operating fingers 112 and 114. Finger 112 is formed on the upper end of a rock arm 113 which is pivotally mounted on a bracket 115 depending from stationary die member 35. This arm has a short downward extension 116 carrying roller 117 which operates in a track 118 formed in a member 119 projecting forwardly from casting 34. Finger 114 is pivotally mounted at 120 on arm 113, and has a depending portion 121, which, when arm 113 is moved towards the die, is engaged by a pin 122 projecting from the stationary member 35, thereby causing said finger to be moved toward finger 112 and engage the scrap material.

When rock arm 113 is moved in an opposite direction, or away from the die, the depending portion 121 just before the completion of the movement of said rock arm, is engaged by a stationary arm 124 carried by the frame of the machine, and movable finger 114 is thereby disengaged from finger 112, so that the scrap material is released and discharged onto the floor or into a suitable receptacle. The extreme end of the depending portion 121 is V-shaped and is yieldingly engaged by the V-shaped end of a spring pressed member 123 which imparts snap action to the movable finger 114.

Extending into the die member 37 is a discharge pipe 125 having suitable discharge openings formed therein which are controlled by the movable die member so that compressed air may be discharged through said movable member onto the stationary member after each blanking and scoring operation to remove small particles of material therefrom, and thus keep the die members free and in proper working condition. The compressed air is supplied to the discharge pipe 125 from a suitable air reservoir by means of a pipe 126.

The transferring mechanism is designed to take the blank from the stationary die member after it has been cut and scored and deposit it automatically in proper position in the folding mechanism 13. This transferring mechanism consists of two horizontally disposed blades. One of said blades 130 has a sleeve 131 by means of which it is fixed to the upper end of a rotating shaft 132 journaled in suitable bearings forwardly and rearwardly of the blanking mechanism and the other blade 134 is pivotally mounted by a pin 135 on sleeve 131 below blade 130 and is movable relatively thereto into blank engaging and disengaging positions. Blade 134 has a depending tubular portion 136 which has a telescopic engagement with a tubular portion 137, the lower end of which terminates in a downwardly presented V-shaped portion 138. An upwardly V-shaped portion 139 is formed on member 140 and is adapted to have co-operative engagement with V-shaped portion 138. Member 140 is suspended from links 141 from the opposite sides of a pair of parallel ribs formed on the underside of a disk 142, which latter is fixed to the lower end of sleeve 131.

Depending from member 140 is a roller 143 which is adapted to be engaged by a cam 144 carried by disk 145 and a cam projection 146 formed on and projecting upwardly from an arcuate plate 147. Disk 145 is adjustably secured by screws 148 to a stationary portion of die member 35 and by loosening said screws said disk can be adjusted about the axis of shaft 132 to position cam 144 so that roller 143 is actuated thereby at the desired moment and blade 134 is moved into a blank disengaging position.

Plate 147 is also adjustable about the axis of shaft 132 so as to bring cam 146 into engagement with roller 143 at the desired moment whereby blade 134 is moved towards blade 130 and engages the blank. Springs 150 are connected to member 140 and tend to move the latter inwardly and a spring 151 is interposed between tubular telescopic portions 136 and 137 and holds portion 138 in yielding engagement with portion 139.

As the shaft 132 rotates, roller 143 rides upon cam 144 and is thereby forced outwardly, causing member 140 to swing outwardly on its link supports so that portion 139 in passing over the outwardly presented portion 138 forces tubular portion 137 upwardly compressing spring 151. As soon as V-shaped portions 138 and 139 pass each other, tubular portion 137 moves downwardly and causes blade 134 to rock on pivot 135 and moved downwardly to occupy the blank releasing position, as shown in Figure 24.

When blades 130 and 134 reach in their travel about the axis of shaft 132 the proper position with respect to the blank held on the stationary die member 35, the outwardly moved roller 143 is engaged by cam portion 146 and is forced thereby inwardly so that blade 134 is actuated and is caused to move quickly towards blade 130 to engage the blank, the interengaging V-shaped portions 138 and 139 imparting snap action to blade 134 and maintaining said plate under tension so that the blank is securely gripped between said blades while being transferred from the die to the folding mechanism.

In order to enable blade 134 to be positioned under the blank, while the same is resting on die member 35, a series of yielding members 154 are arranged in said die and project upwardly from the face thereof through suitable openings formed therein, and hold the blank elevated a slight distance above the face of die member 35.

Members 154 are yieldingly held in their raised positions by springs 155 which are located in suitable recesses formed in the body portion of die member 35 and have their ends bearing against the lower ends of membesr 154. Said members 154 co-operate with pins 105 yieldingly mounted in movable member 37 and the pressure exerted by springs on pins 105 is less than the pressure of springs 155 so that members 154 are not forced downwardly by pins 105 until the punch or movable die member 37 has been moved downwardly a desired distance.

Shaft 132 extends downwardly below casting 34 and has mounted on its lower end a bevel gear 156 which meshes with a bevel gear 156ª carried by a horizontally disposed shaft 157. This shaft is mounted in suitable bearings on the forward end frame 14 and is provided with a gear 158 which is in driving engagement with a gear 159 fixed to shaft 28. Thus, blank gripping blades 130 and 134 are operated simultaneously and in proper time relation with the strip positioning means of the blanking mechanism.

The blank forming mechanism 14 is arranged between a horizontally disposed top frame member 160 and a bottom frame member 161 which are supported and spaced from each other by vertically disposed posts 162. A shaft 164 is vertically disposed between said frame members and has its ends journaled therein. The lower end of this shaft projects outwardly below frame member 161 and carries a gear 165 which meshes with and is driven by an idler gear 166 which in turn is in mesh with a gear 167 driven by pinion 168 fixed to shaft 132 above beveled gear 156.

Fixed to shaft 164 a suitable distance above bottom member 161 is a spider frame or rotor 169 having four radially projecting arms which are provided at their ends with vertically disposed pockets 170. One side wall of each pocket is formed by a plate 171 which is detachably secured in position by means of screws 172. Slidably arranged in each pocket is a vertically disposed channel member 173 carrying at its upper end a box shaped housing 174 in the end walls of which are pivotally mounted by means of pins 175 pivotal members 176. The upper ends of these members have fixed thereon horizontally disposed flexible blades 177 and the lower end of each member 176 has journaled therein a roller 178. In the side walls of housing 174 are arranged in a similar manner members 179 carrying at their upper ends flexible horizontally disposed blades 180 and at their lower ends rollers 181. Each channel member 173 has arranged therein an elevator member 182 surmounted by an elevator block or table 184. A pair of actuator members 185 and 186 are also arranged in said channel member, member 185 having its upper end extended laterally to form arms 187 provided with angularly disposed slots 187ª in which operate the respective rollers 178 of pivotal end members 176. Actuator member 186 is provided at its upper end with arms 188 which are arranged at right angles to said member and are provided with angularly disposed slots 189 in which operate rollers 181 of the respective pivotal side members 179.

Slidably arranged in each cover plate 171 and spaced from channel member 173, and the actuator bars assembled therein, is a vertically disposed bar 190, the upper end of which carries a horizontally disposed plate 191. Said plate is arranged between the bottom wall 174ª of housing 174 and the forming block 184, and projecting upwardly from said plate are a series of vertically disposed pins or rods 192 which are adapted to move through vertically disposed openings 184ª formed in the corresponding block 184. The lower end of each arm 190 has an extension 190ª which terminates adjacent to a circular cam 194 fixed to the outer periphery of a ring 195 and the extreme end of this extension has mounted thereon a laterally projecting roller 196 which rides upon the upper face of cam 194 and causes plate 191 to be raised or lowered in accordance with the formation of the cam.

A spring 197 is connected at one end to a pin projecting from bar 190 and at the opposite end to plate 171 and tends to hold roller 196 at all times in engagement with the cam 194.

Actuator bar 186 has a depending portion 186ª carrying a roller 198 which operates in a cam 199 internally arranged on the ring 195. The lower edge of this ring has an inwardly projecting annular flange 195ª which serves to space a ring 200 located within ring 195 concentrically therewith. This intermediate ring 200 has formed in its inner periphery a cam race 201 in which operates a roller 202, carried by an extension 185ª depending from the lower end of each actuator bar 185.

Block carrying bar 182 has a depending portion 182ª provided with a roller 204 which operates in a cam race 205 formed in the outer periphery of a ring 206 which is arranged within ring 200 and spaced therefrom by an inwardly projecting flange 200ª. A ring 207 is arranged concentrically within ring 206 and is spaced therefrom by a flange 206ª formed integral with and projecting from ring 206, and said ring 207 has an external cam race in its outer periphery for the reception of rollers 209 carried by depending portions 173ª of each channel member 173. All of these rings which are stationary are held in position on the bottom frame member 161 by screws 210, or other suitable fastening devices. Channel member 173, block carrying bar 182 and actuator bars 185 and 186 and the pins positioning bar 190 are arranged in groups, each group being supported in the outer ends of radial arms of rotor 169. Each of said groups comprises a lower or receiving half of the forming section.

The upper half of each forming section is arranged immediately above its corresponding lower half and in vertical alignment therewith and is carried by a rotor 211 which is fixed to shaft 164 a suitable distance above the rotor 169. Rotor 211 has radial arms, the ends of which are provided with vertically disposed pockets 212 closed at one side by detachable plates 213.

A horizontally disposed plate 214 is adapted to co-operate with block 184 and is operatively supported by the lower end of a channel member 215. There are four of these channel members and each one is slidably mounted in the vertically disposed pocket of a corresponding arm of rotor 211. Each plate 214 is provided on its ends and sides with lugs 214ª in which are pivotally arranged end wing pieces 216 and side wing pieces 217, respectively. These end and side wing pieces which are presented downwardly towards the forming block 184 have reduced upper ends carrying rollers 216ª and 217ª, respectively.

Slidably arranged in each channel member 215 is an actuator bar 218 having at its lower end laterally projecting arms 219 in which are formed open ended slots 220 for the accommodation of rollers 216ª of end wing pieces 216. An actuator bar 221 is arranged in channel member 215, adjacent to bar 218, and has at its lower end arms 222, which project at right angles therefrom, and have arranged therein open ended slots 224 in which operate rollers 217ª of side wing pieces 217. A plate 225 is arranged above arms 219 and 222 and has a central opening through which operate the upwardly projecting channel members 215 and actuator bars 218 and 221. Depending from said plate are pins 226 which pass through suitable apertures formed in plate 214 and have their lower ends adapted to bear against the blank and hold it in position in the forming section. These pins are actuated by a bar 227 which has fixed to its lower end plate 225 and projects upwardly through plate 213 in which it is slidably mounted. Centering pins 228 are suitably supported on plate 214 and project downwardly so as to engage the notched corner portions of the blank and position the latter with respect to the forming mechanism. The lower ends of these pins are preferably shaped so as to conform to the angular notches of the blank, as indicated at 228ª in Figure 42. These pins are spaced sufficient distance from plate 214 so that when said plate is brought against the forming block 184, pins 228 will not strike the block but will occupy positions alongside thereof.

Bar 227 is provided at its upper end with an extension 227ª having a laterally projecting roller 229 which rides on the upper face of a circular cam track 230 arranged externally on a ring 231. This ring has formed on its inner periphery an internal cam race 232 in which operates a roller 234 which is mounted on an extension 221ᵃ of bar 221. A ring 235 is concentrically arranged within ring 231 and is spaced therefrom by a horizontally disposed flange 231ᵃ formed integral with ring 231. An external cam race 236 is formed in the outer periphery of ring 235, and operating in this cam race is a roller 237 carried by an extension 218ᵃ of actuator bar 218. A ring 239 is concentrically disposed within ring 235 and is spaced therefrom by an annular flange 235ᵃ projecting inwardly from the ring 235. Ring 239 has formed on its outer periphery an external cam race 240 in which operates roller 241 carried by an extension 215ᵃ of channel member 215. These rings are located immediately below the top frame member 160 and are stationarily supported thereon by fastening means 242.

As shaft 164 is rotated, rotors 169 and 211 are actuated causing the forming sections mounted in the ends of the rotor arms to revolve about the axis of said shaft. The rollers mounted on the extensions of the various bars and channel members are caused thereby to traverse their respective cam races, which are held stationary, thus causing their respective bars and channel members to move in vertical planes in a predetermined order so that the mechanism supported by said bars and channel members are actuated and co-operate with each other in proper time relation.

When one of the forming sections reaches a predetermined position, bar 190 is actuated whereby pins 192 are raised above block 184. A blank is now deposited on the upper ends of said pins in any suitable manner, preferably by the automatically operated transferring blades 130 and 134. Pins 226 are then brought downwardly against the blank through the co-operation of roller 229 and cam 230 and hold the blank against displacement (Figure 47.) Pins 192 then move downwardly so that the blank is positioned on block 184 and plate 214 is moved downwardly against the folding block 184. Simultaneously with the movement of plate 214, or immediately thereafter, wing pieces 216 and 217 are operated to bend the marginal portions of the blank downwardly against the side walls of the forming block. (See Figure 48.) The actuation of wing pieces 216 and 217 is accomplished by bars 218 and 221, respectively, which are moved upwardly through the co-operation of rollers 237 and cam race 236 and roller 234 and cam race 232, respectively, so that the upper ends of said wing pieces are moved outwardly by the slotted arms of said bars thereby rocking said wing pieces 216 and 217 on their pivots on plate 214 and bringing the operating lower ends of said wing pieces downwardly and inwardly against the forming block 184, thus folding or bending the marginal portions D of blank B. The movement of the actuator bars 218 and 221 is preferably arranged so that the blank is operated upon by wing pieces 216 and 217 simultaneously. While the pivotal pieces 216 and 217 hold the marginal portions of the blank against the block, actuator bars 185 and 186 of the lower half of the corresponding forming section are moved upwardly towards block 184 by their respective rollers and cams and operate pivotal pieces 176 and 179, which have been previously properly positioned with respect to block 184, so that the flexible plates 177 and 180 of said pivotal pieces engage the lower edges of the downwardly bent portions of the blank and hold them against the block (see Figure 49). Bars carrying wing pieces 216 and 217 and plate 214 are now moved upwardly out of engagement with block 184.

During the blank forming operation, the forming section containing the blank revolves around the axis of shaft 164 and is carried toward the band applying mechanism. About the time the upper half of the forming section is moved out of engagement with the lower half, the forming block 184 reaches a position wherein one of the side walls of the formed blank, or one of the corners thereof is brought against the glued side of the band, which is held in the path of travel of said forming block and on the same horizontal plane therewith, as shown in dotted lines in Figure 29.

The end of this band is gripped between a vertically disposed roller 244 and the concave side 245 of a cutting blade 246. Roller 244 is carried by an extension formed on the horizontally disposed sliding bar 247 operating in a slot formed in one side of a support 248, the latter being suitably arranged adjacent to the shaft 164 above the rotor 169, and connected to the frame of the machine, so that said support is maintained stationary. The gripping and cutting blade 246 is pivotally mounted at 249 to the extension of sliding bar 247 immediately below roller 244 and the lower end of said blade is formed with a slot 250 in which operates a roller 251 carried by the angularly disposed portion of a bellcrank 252.

This bell-crank is pivotally mounted at 254 on sliding bar 247 and is provided on its forward end with a roller 255 adapted to engage a cam 256 fixed to a stationary block 257 which forms part of, or is fixed to support 248. A spring 258 connected at one end to the long arm of bellcrank 252 and anchored at its opposite end to a pin carried by sliding bar 247 tends to maintain the short arm carrying roller 255 in a raised position and the cutting blade 246 in gripping engagement with roller 244 (see Figure 60).

Sliding bar 247 has pivotally connected thereto one end of link 259, the opposite end of which is pivotally connected to the free end of a horizontally disposed rocker arm 260 pivotally mounted on an extension 261 of support 248. This rocker arm has secured thereto a suitable distance from its pivotal mounting a vertically disposed roller 262 which is designed to be operated by a cam 264. This cam is fixed to shaft 164 and rotates therewith and operates through roller 262 rocker arm 260. A spring 265 is connected at one end to rocker arm 260 and at its opposite end to the projection formed on support 248, and tends to move rocker arm 260 towards shaft 164 and maintain at all times roller 262 in operative engagement with cam 264.

Block 257 has a horizontally extending heel portion 266 the upwardly presented face 266ª of which curves upwardly and forms a track on which rides roller 356 of bell crank 252.

A presser roller 267 extends downwardly from a horizontally disposed arm 268 and is adapted to be placed in the path of travel of block 184 and press against the advanced inner end wall. As the rotors carrying the forming sections revolve on the axis of shaft 164, the section carrying the formed blank is brought adjacent to the band the end of which is gripped between roller 244 and blade 246. The band extends in a horizontal direction and is vertically disposed in the path of travel of said blank, with the glued side facing and in line with the side walls of said blank. The continued movement of the blank carrying section positions the advanced side wall or the corner formed thereby and the advanced or inner end wall against the band, as shown in dotted lines in Figure 29. Roller 267 which is disposed adjacent to the obverse or glued side of the band is caused to engage the inner end wall of the blank and press the band thereto. Upon reaching the corner formed by the inner end wall and the rear side wall, this roller passes over said corner, bending the released end of the band thereover and applying the extremity to said rear side wall.

Figure 3:
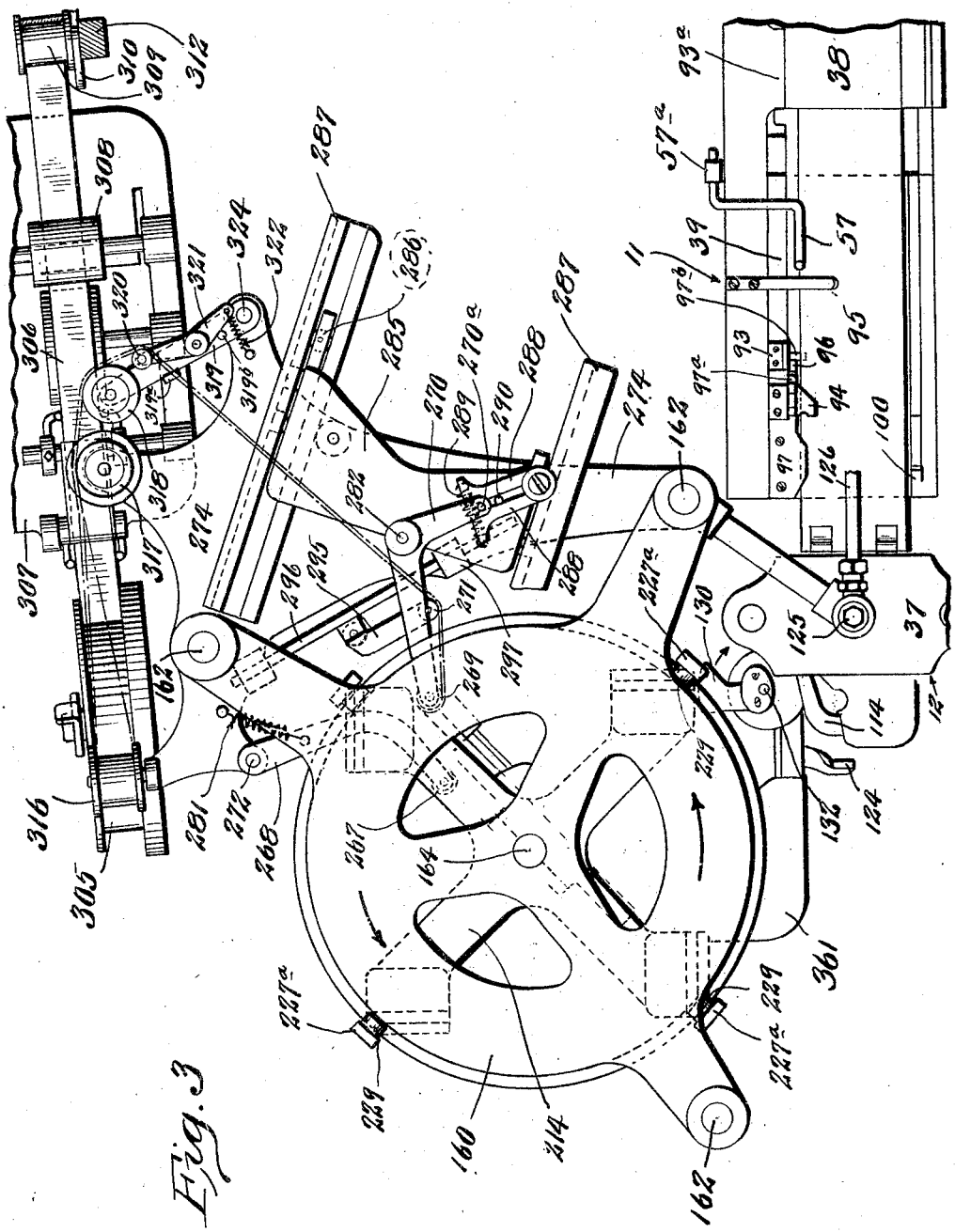
Figure 3 is a plan view of the rear portion of the machine.

The band is yieldingly held taut, and as the section carrying the blank is moved around the axis of shaft 164, the advanced or forward side wall of the blank is presented to the glued side of the band and then the outer end wall. While the band is engaged by the moving blank a pressure roller 269 which also is disposed in the path of travel of said blank bears against the glazed side of the band and presses said band to said advanced side wall and the outer rear wall. Thus the band is applied at this stage to the forward side wall and both end walls of said blank, the end of the band being applied by presser roller 267 to the rear side wall. The reference to the forward and side walls of the blank is to be understood in accordance with the direction of travel of the forming sections, which is anticlockwise, or away from the blanking mechanism 12, as indicated by arrows in Figures 3 and 29. After finishing its travel over the outer end wall, the presser roller 269 which depends from a horizontally disposed bellcrank 270, is moved inwardly towards shaft 164 along the rear side wall (Figures 58 and 29), engaging that portion of the band which is disposed between the forming section and a roller 271.

The inward movement of said roller doubles or loops the band, one portion of said loop being pressed by the roller to the rear side wall of the blank while the other portion is arranged in the path of the band severing mechanism. After roller 269 is moved inwardly a sufficient distance, cutting blade 246 which has been moved in the meantime to the position indicated in Figure 63, is released severing the band at a point between presser roller 269 and roller 271, and the end of the supply portion of the band is held by said blade against roller 244 in readiness for the next forming section. Presser roller 269 now completes its inward movement and presses the remaining portion of the band which has been severed against the rear side wall of the blank partially overlapping the glued end of the previously applied band portion.

Arm 268 is carried by the upper end of a vertically disposed shaft 272 which is journaled in suitable bearings formed on a casting 274. This casting is arranged rearwardly of the machine and is supported on standards 162. The lower end of this shaft has fixed to it a short arm 275 which is connected by a link 276 to one end of a bellcrank 277 loosely journaled on the lower end of boss 274ª formed integral with and projecting downwardly from casting 274.

The long arm of bellcrank 277 has fixed thereto a roller 278 co-operating with a cam 279 which is fixed on a vertically disposed shaft 280. A spring 281 is anchored at one end to casting 274 and has its opposite end connected to arm 268 and yieldingly holds presser roller 267 against the side walls of the formed blank and tends to maintain roller 278 in co-operative relation with cam 279. The outer periphery of this cam is formed so that rocker arm 277 is actuated at the proper time and arm 268 is rocked to bring roller 267 against the side walls of the formed blank when the forming section carrying the blank occupies a predetermined position and to maintain said roller when it is not operating on the blank out of the way of the remaining mechanism.

Bellcrank 270 is pivotally mounted on a pin 282 projecting upwardly from a horizontally disposed shelf 284 which is carried by and spaced from a traveling table or carriage 285 by lugs 284ᵃ. This table is provided on each side with rollers 286 which ride in suitable tracks formed in horizontally disposed bars 287 arranged on casting 274. The short arm of bellcrank 270 has a downwardly projecting pin 270ᵃ against which bear at diametrically opposite points levers 288, which are pivotally mounted at 288ᵃ on shelf 284 and are yieldingly held in engagement with pin 270ᵃ by means of a spring 289 the ends of which are connected to the free ends of said levers. A pin 290 projects upwardly from shelf 284 between levers 288 and acts as a stop for one of said levers when bellcrank 270 is rocked and displaces the other lever.

This arrangement permits yielding movement of bellcrank 270 in either direction, so that roller 269 may yieldingly press the band to the opposite side walls of the blank and enables the bellcrank to resume its normal position when presser roller 269 is disengaged. Bellcrank 270 is preferably removably arranged in pin 282 and is provided with a sleeve 270ᵇ which forms an enlarged pivotal bearing for said bellcrank and insures accurate positioning of presser roller 269 with respect to the side walls of the formed blank.

Table 285 is movable towards and from the forming section, when the latter occupies the band applying position, in order to cause roller 269 to move inwardly and apply the band to both side walls and the outer end wall of the formed blank, and to position the band in readiness for the severing operation. The actuation of said table is effected by a crank arm 291 fixed to the upper end of shaft 280 which end projects outwardly through the casting 274 and has a bearing in a boss 292 formed on said casting. Arm 291 has a roller 294 which operates in cam race 285ᵃ formed on the underside of table 285.

Roller 271 is carried by the horizontal portion of the upper end of a vertically disposed bar 295, the latter being fixed to a horizontally arranged reciprocating bar 296 having a bearing in lugs 297 of casting 274. The lower end of bar 295 is pivotally connected to one end of a link 298 whose opposite end is pivotally connected to the free end of an arm 299 which is pivotally connected at 300 to the underside of casting 274. This arm is provided with a roller 301 which operates in a cam race 302 formed in a disk 304.

This disk is fixed to shaft 280 immediately below casting 274 and occupies a predetermined position relative to cam 279, so that bar 296 is moved forward and roller 271 engages the band at the proper time during the band applying operation, and in co-operation with roller 269, places the band in the path of travel of cutting blade 246, so that the latter having been previously moved into open position, passes under said band as shown in Figure 63 preparatory to the severing operation.

The band is supplied in the form of a roll, such as indicated at 305, which is located in a suitable position on the frame of the machine. The band is passed from said roll over a glue roller 306 which is journaled on a glue pot 307 and has its lower portion immersed in the glue contained therein, so that the outer periphery of said roller is coated with glue.

In passing over this roller, the reverse side of the band engages the outer periphery of the roller and receives the coating of glue therefrom. The band is then passed under a roller 308 with the glued side presented outwardly, and is then passed over a roller 309 carried by one arm of a bellcrank 310. This bellcrank is pivotally mounted on a block 311 which is adjustably arranged on a vertically disposed standard 312 so that the roller 309 may be adjusted vertically with respect to roller 308. The opposite end of bellcrank 310 has connected thereto one end of a spring 314, the other end of which spring is connected to a projection on block 311. This bellcrank and spring 314 form a yielding mounting for roller 309, whereby the band is yieldingly held under proper tension. A roller 315 is adjustably arranged on standard 312 a suitable distance above roller 309 and the band after passing over this roller is connected to a roller 316 which is carried by casting 274 and is arranged above the band roller 305.

From roller 316 the band is passed over a vertically disposed roller 317 which is adjustably arranged in a suitable bearing formed on the casting 274 and the band in passing over this roller makes a one-quarter twist so that instead of being disposed horizontally as heretofore, it is now arranged vertically. A roller 318 is mounted on the free end of an arm 319 adjacent to roller 317 and the band passes over this roller and then engages a smaller roller 320 arranged on one end of a lever 321 which is pivotally mounted on arm 319. The band after passing over small roller 320 is carried towards the machine and its end is gripped between roller 244 and blade 246, as hereinbefore described. The opposite end of lever 321 is engaged by a spring 322, one end of which is fixed to a pin on casting 274. This roller 320 forms a yielding support for the band and maintains that portion of the band leading from roller 318 to the forming mechanism under proper tension. Suitable stops 319ᵃ and 319ᵇ are arranged on arm 319 to prevent excessive movement of lever 321.

Arm 319 is fixed to the upper end of a shaft 324 journaled in bearings 325 which are arranged in any suitable manner on casting 274. The lower end of shaft 324 has fixed thereto an arm 326 the free end of which is connected by a link 327 to one end of an arm 328 which is pivotally supported at 329 in a bearing 330 formed integral with or fixed to and projecting from said casting 274. The lower end of shaft 272 carrying arm 268 is also journaled in bearing 330. Arm 328 which is horizontally disposed has arranged thereon a vertically disposed roller 331 which rides upon the outer periphery of and is operated by a cam 332 fixed to shaft 280 below cam 279. A spring 334 is connected at one end to casting 274 and at its other end to an arm 326 and tends to hold roller 331 in operative engagement with cam 332.

The glue pot 307 is of usual construction and is heated in any suitable manner, such as by a heater 335 arranged under the glue pot.

The band after leaving the glue roller has its glued side presented outwardly so that in passing over the various rollers the unglued side engages the peripheries of said rollers. Roller 315 is adjustable on standard 312 in order to increase or decrease, as the case may be, the length of time required by the band to reach the forming sections so that the glue on the band is neither too dry nor too moist when the band is applied to the side walls of the formed blank. This adjustment is necessary as the time required for the glue on the band to set or be in proper condition will vary due to the changes in the atmosphere and to the inherent qualities of various glues.

Shaft 280 derives its motion from gear 165 through an idler 336 which meshes with said gear and drives gear 337 fixed to the lower end of shaft 280. Thus, the cam-actuated presser rollers 267 and 269 and roller 271 are operated in a predetermined order and at a desired speed relative to the blank forming mechanism, so that said presser rollers engage the band and the side walls of the formed blank at the required time and roller 271 positions the band in predetermined time relation with the severing mechanism.

The cutting blade 246 in severing the band co-operates with a stationary blade 338 which is carried by extension 247$^a$ adjacent to roller 244 and is secured in position by means of screws 340, there being suitable slots formed in said blade to accommodate screws 339.

Roller 244 is preferably removably mounted in extension 247$^a$ and is held in position by means of a vertically disposed pin 341 which passes through a longitudinal opening formed in said roller and has its lower end resting in a suitable bearing formed in extension 247$^a$ while its upper end, which is provided with a knurled knob, is seated in a plate 342 arranged on top of extension 247$^a$. Roller 244 is made removable so that it can be easily cleaned and the glue removed therefrom. In order to prevent that portion of the band which is gripped between blade 246 and roller 244 from adhering to the periphery of the roller, the latter is automatically partially rotated shortly after the band is released therefrom so that a clean surface is always presented to the band. This partial rotative movement is accomplished by means of a ratchet wheel 344 which is mounted on pin 341 immediately below the lower end of roller 244 and is held in rotative engagement with said roller by means of a pin 345 which is seated in said ratchet wheel and projects upwardly into an opening formed in the lower end of said roller. This ratchet wheel is engaged by a horizontally disposed pawl 346 pivotally mounted on the outer end of a rocking arm 347 which is pivotally supported at 348 on extension 247$^a$. A projection 349 is formed on arm 347 and is adapted when sliding bar 247 and parts associated therewith are moved inwardly towards shaft 164 to strike a pin 350 which is carried by block 257 and lies in the path of movement of said projection 349. When this projection engages pin 350, which action is timed to take place immediately before the completion of the inward movement of sliding bar 247, arm 347 is rocked on its pivot causing pawl 346 to actuate ratchet wheel 344 so that roller 244 is partially rotated in the direction indicated by the arrow in Figure 61. Upon the return movement of sliding bar 247, as soon as projection 349 leaves pin 350, arm 347 is moved to its normal position and pawl 346 is permitted to ratchet over the teeth of ratchet wheel 344 and assume its normal position. This restoring movement of arm 347 and ratcheting of pawl 346 is accomplished by a spring 351 connected at one end to a pin 352 which is fixed to said pawl near the pivotal mounting thereof, so that said spring restores both arm 347 and pawl 346.

The periphery of roller 244 is preferably kept moist with suitable liquid so as to prevent the glued side of said band from adhering to the roller. The preferred method of supplying moisture to the periphery of roller 244 is illustrated in Figures 61 and 63 wherein a well 353 containing suitable liquid is shown in the upper portion of extension 247$^a$ and this liquid is applied to the periphery of said roller by means of a wick 354, one end of which extends into the well 353 while its opposite end is arranged in a chamber 355 and engages a portion of the periphery of said roller. Well 353 is filled with a liquid and that end of the wick which is arranged in chamber 355 is by capillary attraction kept saturated with this liquid, and so keeps the periphery of the roller 244 moist.

After the band is released, sliding bar 247 moves inwardly and occupies the position shown in Figure 62. During this inward movement roller 356 rides upon the lower edge of cam 256 and causes a roller 356 which is laterally arranged on the apex of the angularly disposed portions of the rear arm of bellcrank 252 to move upwardly past the hump or curved portion 266ª of heel portion 266. When said roller 356 starts its forward travel, it rides under and lifts the free end of a curved arm 357 which has its pivot 358 loosely arranged in one end of a horizontally disposed bar 359, the other end of which is secured to block 257. After roller 356 has passed from under the free arm 357, said arm returns to its normal position so that its end rests on heel portion 266 in the path of the return movement of roller 356. A spring 360 is anchored at one end to bar 359 and has its opposite end seated in the pivot 358 of arm 357 and insures the positioning of said arm in co-operative relation with heel portion 266. The outer end of bar 359 extends beyond the pivotal support 358 of arm 357 and has an inwardly presented lateral projection 359ª which lies in the path of travel of roller 356 and forms a continuation of the roller track as provided by the upper face of arm 357. The extreme end of projection 359ª terminates in oppositely inclined faces 359ᵇ which are adapted to co-operate with roller 356 and guide the same in its travel.

When sliding bar 247 begins to move outwardly or rearwardly into its extended position in the direction indicated by the arrow in Figure 62, roller 356 moves down over the hump 266ª and engages the curved free end of arm 357, whereupon said roller rides upon the upper face of curved arm 357. As this arm is inclined upwardly in the direction in which the roller 356 is traveling, said roller is gradually raised, causing bellcrank 252 on which it is mounted to rock on its pivotal support 254, whereby roller 251 carried by the extreme end of the angular arm of bellcrank 252 is moved upwardly, causing the blade 246 to move on its pivot 249 into an open position, as indicated in full lines in Figure 63.

The continued outward movement of sliding bar 247 moves the blade 246 under and past that portion of the band which extends from roller 271 to presser roller 269 so that this portion of the band is located between the stationary blade 338 and movable blade 246. During this movement of sliding bar 247, roller 356 leaves arm 357 and rides over the projection 359ª and then down the downwardly inclined face 359ᵇ. As soon as the roller leaves the inclined face 359ᵇ, spring 258 which has been tensioned by the rocking of the bellcrank 252 quickly restores said bellcrank to its normal position, causing blade 246 through the interengagement of its slotted end with roller 251 to instantly move towards roller 244 thereby severing the band and pressing the severed end of the band against the roller 244, as shown in full lines in Figure 60.

After the band has been applied to the side walls of the formed blank, and presser rollers 267 and 269 have moved away therefrom, the projecting edges of the band are bent against the walls of the box or formed blank, as illustrated in Figures 51 and 55.

To fold the upper edges of the band, plate 214 is moved downwardly a proper distance and actuator bar 218 is actuated to move the rollers 216ª outwardly, as shown in Figure 51, thereby swinging the end wing pieces 216 on their pivots causing their lower ends to move inwardly and fold the upper edges of the band against the bottom wall of the box, plate 214 being moved downwardly a slight distance so that pressure is applied by wing pieces 216 to the folded edges of the band.

In the next operation, end wing pieces 216 are moved outwardly, plate 214 having moved upwardly a slight distance to provide operating clearance between the lower ends of the wing pieces and the bottom wall of the box and the side wing pieces 217 are moved inwardly to engage and press the projecting side edges of the band against the bottom wall of the box, as shown in Figure 53. The side wing pieces are now moved outwardly by the bar 221 to clear the block 184 and the box arranged thereon. The end wing pieces and the side wing pieces are then moved downwardly with plate 214 and are actuated by their respective bars 218 and 221 to engage the side walls of the formed box, as shown in Figure 54.

Simultaneously with this operation, or immediately thereafter, block 184 is removed, the box being supported by pins 192, and the channel bar 173 of the lower half of the forming section is moved upwardly to bring the pivotal pieces 176 and 179, pivotally mounted on housing 174, adjacent to the projecting lower edges of the band. Actuator bars 185 and 186 are now operated to move the flexible blades 177 and 180 inwardly past the lower edges of the side walls of the box into the position shown in Figure 54. Housing 174 has been raised by channel member 173 the desired distance so that the upper edges of blades 177 and 180 clear the edges of the side walls of the box but engage the projecting edges of the band and bend said edges inwardly, as shown in said figure.

Channel member 173 and actuator bar 185 are now moved upwardly so that the blades 177 carried by pivotal pieces 176 move upwardly into the box and press the extreme edges of the band against the inner faces of the end walls of said box, as shown in Figure 55, actuator bar 185 being then moved downwardly a slight distance so as to rock the pivotal pieces 176 and move the flexible blades 177 slightly outwardly wiping against the end walls of the box. After the blades 177 have finished their operations, bar 185 is actuated to remove said blades from within the box and bar 186 is now actuated to cause blades 180 to engage the corresponding edges of the band and apply them to the side walls of the box in a similar manner.

When the edges of the band have been folded against the walls of the box, the pivotal pieces 176 and 179 are moved downwardly by channel member 173 to their normal positions, and actuator bars 185 and 186 are also moved downwardly to their normal positions, block 184 having been restored previous to the upward movement of the channel member 173 in order to permit the positioning of the flexible blades within the box. The box was supported on pins 192 carried by plate 191 during the infolding of the lower edges of the band. These are now retracted to their normal positions and the finished box is held by the wing pieces 216 and 217, which engage the side walls thereof.

The particular forming section whose operation is being described has by this time finished about three-fourths of its travel about the axis of shaft 164 and the box is carried by wing pieces 216 and 217 towards a table 361, which is suitably supported in position and extends forwardly in a radial direction from shaft 164, as shown in Figure 66. The horizontal plane of this table is slightly below the horizontal plane of the edges of the box so that when the forming section reaches a certain position, the box is located above the table 361. Bars 218 and 221 are now actuated causing wing pieces 216 and 217 to swing outwardly on their pivotal supports 214ª, thereby releasing the box, which then drops onto table 361. A notch 361ª is formed in the corresponding edge of the table 361 to provide clearance for the nearest centering pin 288 when the bar is being positioned on the table.

When the operating parts of both halves of the forming section are moved to their respective normal positions there is sufficient clearance between the upper and the lower halves of each section to permit them to pass freely above and below the table 361.

After the finished box has been positioned on table 361, a kicker arm 363 is actuated and discharges the box from the machine into a suitable receptacle placed on the floor. This kicker arm is carried by one end of a horizontally disposed bellcrank 363 which is pivotally mounted at 364 on table 361 and has at its opposite end a roller 365. A cam 366 is fixed to shaft 164 and rotates therewith and is provided with high nose portions 367 and recesses 368 whereby, as said cam is rotated by shaft 164, roller 365 is moved outwardly by portions 367 and is then suddenly released and moves under the influence of spring 369 inwardly into recess 368. This sudden movement of roller 365 inwardly causes the kicker arm 362 to move outwardly and strike the finished box and discharge it from table 361.

Cover plate 370 is arranged above the cam rings of the lower mechanism of the forming section and prevents small pieces of scrap material from falling between said wings.

In the operation of the machine, the material from which the boxes are made is supplied to shelf 38 either in the shape of strips, which are stacked on the table 15 and singly positioned on said shelf, or in the form of a roll suitably supported and fed onto said shelf. This material is then intermittently fed forward to the blanking and scoring mechanism 12 by the reciprocating carriage 39. After the blank is cut and scored, some of the waste material falls into the trough 107 and is removed therefrom by plunger 108 while other waste material is automatically removed by fingers 112 and 114.

The stroke of the movable die member can be varied by adjusting the connecting rod 33 in order to regulate the depth of the score lines. The blank at the proper time is engaged by revolving blades 130 and 134 and carried by them towards the blank folding mechanism 13 and deposited in a horizontal position on pins 192 of one of the forming sections. The rotation of rotor shaft 164 is so timed relative to the blanking operation as to place one of the forming sections in position to receive the blank from said transferring blades. The blank is now operated upon by wing pieces 216 and 217 of the upper half section whereby the marginal portions of the blank are bent downwardly against the sides of the forming block or mandrel 184 and said bent portions are engaged by flexible blades 177 and 180 of the lower half section so as to hold the folded sides of the blank in position during the band applying operation and during the time the upper projecting edge of the band is being folded against the bottom wall of the box by wing pieces 216 and 217. The vertical movement of the wing pieces and the flexible blades relative to each other is limited so that said wing pieces and said blades can simultaneously engage the sides of the formed blank without the danger of striking each other or otherwise interfering with each other's operation.

Roller 267 which engages the inner or advanced end wall of the formed blank is yieldingly applied thereto by means of spring 281 which is connected to arm 268. This arm is actuated through suitable connections from cam 279 which is fixed to cam shaft 280. Cam 279 is formed so as to cause roller 267 to press against the inner end wall after the band has been applied to said wall while the position of the blank is constantly changing due to the rotation of shaft 164 and to maintain said roller out of the way after said roller has finished its banding operation.

Roller 269 engages the side walls and the outer end wall of the formed blank and in order to enable said roller to yieldingly engage either one of said side walls, the bellcrank 270 on which said roller is supported is yieldingly mounted by virtue of spring held arms 288 so that said bellcrank may be yieldingly rocked in opposite directions. This bellcrank is mounted on a horizontally disposed table 285 which is movable towards and from the forming section when the latter occupies the band applying position. This table is actuated from cam shaft 280 by arm 291 having an upwardly presented roller which operates in cam 285ᵃ formed on the underside of said table. This cam is formed so as to cause roller 269 to move outwardly when traveling over the advanced or outer side wall of the blank and to maintain said roller practically stationary when engaging the outer end wall of the blank. When roller 269 engages the rear side wall, table 285 moves inwardly and the formation of cam 285ᵃ is such that this inward movement of table 285 and roller 269 is accelerated in order to enable said roller to finish its banding of the rear side wall before the blank is moved out of engagement with said roller.

Roller 318 is actuated through suitable connections by cam 332 so as to relieve tension at the proper time on the band while the latter is engaged by the side walls of the blank.

The sliding bar 296 carrying roller 271 is moved forwardly by cam 301 before cutting blade 246 is actuated so that roller 271 cooperates with roller 269 and places the band between said blade and the stationary blade 338.

Blade 246 is moved into an open position before it is moved by the sliding bar 247 past said band. When in this open position, blade 246 is spaced a suitable distance below the lower edge of the band so as to provide suitable clearance for positioning said blade. After roller 356 leaves projection 359ᵃ, plate 246 is caused by spring 258 to move upwardly towards roller 244 and cut the band which has previously been positioned in its path by rollers 269 and 271. After severing the band, bar 247 is retracted inwardly at the proper time, and during this inward movement roller 255 carried by the short arm of bellcrank 252 rides down the inclined cam 256 thereby rocking said bellcrank and enabling roller 356 to pass from under bar 357. Upon its outward movement, roller 356 is engaged by hump or upwardly curved portion 266ᵃ thereby slightly rocking bellcrank 252 so that blade 246 is partially moved from roller 244. This partial movement of blade 246 releases the end of the band which has been heretofore gripped between said blade and the roller, and the released end of the band is engaged by roller 267 and pressed against the side wall of the formed blank.

Sliding bar 247 is actuated by cam 264 which is adjustably secured to shaft 164. Support 248 in which sliding bar 247 is mounted and arm 261 to which is pivotally connected one end of roller arm 260 are held stationary by being engaged to the fixed portion of the machine and preferably to table 361 which is rigidly secured to the frame of the machine.

The sides of the forming block 184 are preferably concave, as indicated at 184ᵇ, so that the flexible blades 177 and 180 in pressing the walls of the blank against said sides slightly distort said walls curving them inwardly, whereby when the band is applied to said walls, the contraction of the band caused by the drying of the glue does not distort the side walls of the box so that they bulge outwardly but merely straightens out the inwardly curved side walls of the box so that the same present a normal appearance.

In folding the blank, the same is held stationary relative to the forming section, and the forming section on which the blank is arranged and the blank are moved continuously in a circle concentric with shaft 164 until the blank is formed into a box and discharged from the machine. Thus, it will be seen that there is no time lost in operating upon the blank and the machine can be steadily operated without stopping to receive each blank, as the blank transferring mechanism is automatically operated in cooperation with the blank folding mechanism.

In applying the band, the latter is held in the path of the blank as the latter is carried around shaft 164 by the corresponding forming section and said band is caused to engage the side walls of the blank as said blank is carried rearwardly between rollers 244 and 271. Presser rollers 267 and 269 normally occupy positions whereby they may be engaged by the side walls of the advancing blank, as shown in dotted lines in Figure 58, and press the band against the walls thereof. The actuation of the cam shaft 280 relative to rotor shaft 164 is designed so that the parts associated with the cams arranged on said shaft are operated in time relation with the forming mechanism.

The operation of the machine is continuous, and its various mechanisms and their actuating connections are so designed as to cause each successively operating part to operate at the appropriate time, so that each step of the operation follows the preceding one without delay or necessitating action on the part of the operator, except to see that the machine is supplied with the material and to remove the receptacle after it is filled with the finished boxes. While I have shown the preferred form of my box making machine, it will be understood that various changes in the size, form and constructions of the various parts of my machine can be made and substituted for those herein shown without departing from the spirit of my invention.

What I claim is:

1. A box making machine comprising a table for receiving and supporting the strips of material, blank cutting and scoring mechanism, a traveling carriage adapted to receive said strips and feed them to said cutting and scoring mechanism, a folding mechanism designed to receive the blank and form it into a box, mechanism for applying a finishing band to the side walls of said box, means for actuating said cutting and scoring mechanism in co-relation with said traveling carriage, and means for imparting reciprocating motion to said carriage.

2. A box making machine comprising a blank cutting and scoring mechanism, a traveling carriage adapted to receive the material and feed it to said cutting and scoring mechanism, a folding mechanism designed to receive the blank and fold it into the shape of a box, mechanism cooperating with said folding mechanism for applying a glued retaining strip of material to the folded blank, and means for actuating said folding mechanism in time relation with said blank cutting and scoring mechanism.

3. A box making machine comprising a blank cutting and scoring mechanism, a traveling carriage adapted to receive the material and feed it to said cutting and scoring mechanism, a folding mechanism designed to receive the blank and fold it into the shape of a box, means for actuating said folding mechanism in time relation with said blank cutting and scoring mechanism, mechanism for applying a strip of retaining material to the folded blank, and means for discharging the finished box.

4. In a box making machine, the combination with the blank folding mechanism, of a die mechanism for cutting and scoring a blank from a strip of cardboard, means operating in the same plane with said die and said folding mechanism for transferring the blank from the die to said folding mechanism, and means for feeding a strip of material to said die.

5. In a box making machine, a blank folding mechanism, a die mechanism for cutting and scoring a blank from a strip of material, means arranged in the same plane with said mechanism for transferring a blank from the die to said folding mechanism, and means for actuating said transferring means and said folding mechanism and said die mechanism in time relation with each other.

6. In a box making machine, a blank folding mechanism, a die mechanism for cutting and scoring a blank from a strip of material, means for automatically transferring a blank from said die mechanism and in the same plane therewith to said folding mechanism, and means for intermittently feeding a strip of material to said die mechanism in time relation therewith and controlled thereby.

7. A box making machine comprising a blank horizontally disposed rotatable folding section, means arranged tangentially to said section for feeding blanks thereto, and mechanism for applying a finishing band to the side walls of the formed blank.

8. A box making machine comprising a plurality of blank forming sections sequentially operated, means for feeding one piece blanks to said sections, means for applying a finishing band to the side walls of the formed blank, and means for discharging the finished box.

9. A box making machine comprising a forming section having a plurality of blank folders revoluble about a common axis and adapted to receive a blank of material and form it, means for applying a finishing band to the side walls of said blank while the latter is held in a box shaped position, and means for actuating said forming section and said band applying mechanism in time relation with each other.

10. A box making machine comprising a revoluble support, a plurality of forming sections stationarily mounted on said support and sequentially operated, means for positioning a one piece blank in each section as the latter reaches a predetermined position, means for applying an adhesive band to the side walls of the formed blank, and means for actuating said sections in time relation with said blank feeding mechanism and said band applying mechanism.

11. A box making machine comprising a plurality of blank forming sections sequentially operated, means for feeding blanks of material to each section, each blank being formed of a single piece comprising a bottom wall and side walls, mechanism for applying a finishing band to the side walls of the blank, and means on each section for infolding the edges of the band against the walls of the formed blank.

12. A box making machine comprising, a support rotatable in a horizontal plane, a forming section fixed to said support and adapted to receive a blank of material, means operable in time relation with said forming section and arranged to apply one end of an adhesive band to the side walls of the formed blank, and means adapted to travel over the side walls of the formed blank and apply said band thereto.

13. A box making machine comprising a plurality of blank forming sections fixedly mounted and revoluble about a common axis, said forming sections being sequentially operated to operate upon a blank of material, means for supplying an adhesive band, a traveling member adapted to engage the free end of said band and apply it to one side of the formed blank, and means adapted to travel over the side walls of the formed blank and apply the band thereto.

14. A box making machine comprising a rotatable support, a plurality of forming sections stationarily carried by said support, means for positioning a single piece blank in each section, a traveling member operable in time relation with said forming sections and adapted to engage one end of a finishing band, means for applying said band to the side walls of the formed blank, and means for actuating said traveling member to release the end of the band engaged by said member.

15. A box making machine comprising a revoluble support, a plurality of forming sections fixedly mounted in said support, means for positioning a blank in each section, a traveling member operable in time relation with said forming sections and adapted to engage one end of a finishing band, means for applying said band to the side walls of the formed blank, means for actuating said traveling member to release the end of the band engaged by said member, and means for severing the desired length of band for each band applying operation.

16. A box making machine comprising a revoluble support, a plurality of box forming sections fixedly mounted in said support sequentially operated and adapted to receive a blank of material, means for supplying an adhesive band to said sections, means for applying said band to the formed blank, and means for cutting the band at the proper time and holding the free end of the supply portion of the band in readiness for the next operation.

17. A box making machine comprising a revoluble support, a plurality of blank forming sections fixedly mounted in said support sequentially operated and adapted to receive blanks of material, means for applying the adhesive band to the side walls of the formed blank, means for cutting and positioning said band in readiness for the band applying operation, and means for actuating said band cutting and positioning means in time relation with said forming sections.

18. A box making machine comprising a revoluble support, a plurality of blank forming sections fixedly mounted in said support sequentially operated and adapted to receive single piece blanks of material, means for applying an adhesive band to the side walls of the formed blank, means for cutting and positioning said band in readiness for the next band applying operation, and mechanism for actuating said band cutting and positioning means in co-operative relation with said band applying means.

19. A box making machine comprising a revoluble support, a plurality of blank forming sections fixedly mounted in said support, each of said sections being adapted to receive and operate upon a blank, means for actuating said forming sections whereby the blanks are operated upon in successive stages, band supplying mechanism, means adapted to travel over the folded side walls of each blank and apply a band thereto, and means for severing the applied portion of the band from the supply portion thereof.

20. A box making machine comprising a support revolubly mounted, a plurality of blank forming sections fixed to said support, each of said sections being adapted to receive and operate upon a single piece blank, means for actuating said forming sections whereby the blanks are operated upon in successive stages, band supplying mechanism, means adapted to travel over the folded side walls of each blank and apply said band thereto, means for severing the applied portion of the band from the supply portion thereof, and means for co-operatively engaging said band applying means with each forming section.

21. In a box making machine, the combination with a revoluble support, of a forming section fixed thereon and adapted to receive a one piece blank, band supplying means, means adapted to travel over the folded side walls of the blank and apply the band thereto, and adjustable means for tensioning said band.

22. In a box making machine, the combination with a blank forming section adapted to receive a blank, of band supplying means, means adapted to travel over the formed side walls of said blank and apply the band thereto, mechanism for severing from the supply portion of the band that portion which is applied to said blank, means for tensioning said band, and means for automatically slackening the tension of said band immediately before the severing operation.

23. In a box making machine, the combination with a revoluble support, of a blank forming mechanism and a band applying means, a slidable member, a band severing member operatively mounted thereon, and means for actuating said severing member in time relation with said blank forming mechanism.

24. In a box making machine, the combination with the blank forming mechanism and the band supplying means therefor, of a movable member, a band severing member pivotally mounted thereon, means for positioning said severing member in readiness for the severing operation, and means for actuating said severing member immediately upon reaching a predetermined position relative to the forming mechanism.

25. In a box making machine, the combination with the box forming mechanism and the band supplying means, of a slidable support, a cutting blade operatively mounted on said support, said blade being adapted to co-operate with said support, whereby the free end of the supply portion of said band is gripped therebetween and held in readiness for the next operation.

26. In a box making machine, the combination with the blank forming mechanism and the band supplying means, of a slidable support, said blade being adapted to co-operate with said support whereby the free end of the supply portion of the band is gripped therebetween and held in readiness for the next operation, means for actuating said support, means for moving said blade into open position, and means for imparting a snap closing action to said blade.

27. In a box making machine, the combination with the blank forming mechanism and the band supplying means, of means for applying a band to the formed blank, a movable support, a cutting blade operatively mounted on said support, and adapted to co-operate therewith to grip the free end of the band after each cutting operation and hold it in readiness for the next band applying operation, means for locking said blade in open position, and means for releasing said blade after each band applying operation.

28. In a box making machine, the combination with the blank forming mechanism and band supplying means, of a slidable support, a roller mounted in said support, a band cutting blade having a concave face adapted to co-operate with the peripheral surface of said roller to grip the free end of the supply portion of the band, means for actuating said support in co-operation with said blank forming mechanism, and means for actuating said blade in time relation with the operation of said support.

29. In a box making machine, the combination with the blank forming mechanism and the band supplying means, of a slidable support, a roller journaled therein, a cutting blade pivotally mounted on said support and adapted to cooperate with said roller to grip the free end of the supply portion of said band, means for actuating said blade, and means for intermittently rotating said roller whereby a clean portion of the peripheral surface of said roller is presented to the band.

30. In a box making machine, the combination with the blank forming mechanism and band supplying means, of means for temporarily gripping the free end of the band, members adapted to travel over the side walls of the formed blank and apply a band thereto, a sliding bar, band cutting means, and means on said bar for engaging said band, and means for actuating said bar whereby the band is placed at the proper time in position for the cutting operation.

31. In a box making machine, the combination with the blank forming mechanism and band supplying means, of means for applying the free end of the band to the side wall of the formed blank, mechanism for cutting the band, said cutting mechanism being movable relative to said forming mechanism, means for applying the cut end of said band to the side walls of the formed blank, and means for actuating said band applying means in co-operative relation with said blank forming mechanism.

32. In a box making machine, the combination with the blank folding mechanism, of a band supplying means, a presser member, a pivotally mounted arm for supporting said member, means for actuating said arm whereby said presser member is caused to travel over the side walls of said formed blank and secure thereto the corresponding portion of the band, band cutting means, and means for placing the band in the path of said cutting means and adapted to apply the severed portion of the band to the side walls of the formed blank.

33. In a box making machine, the combination with the blank forming mechanism, of a band supplying means, a presser roller adapted to travel over the side walls of said formed blank to apply thereto a portion of the band, band cutting means, a yielding member adapted to position the band in the path of said cutting means and operable to apply the cut portion of the band to said formed blank, and means for actuating said yielding member in co-operation with said presser roller and said band cutting means.

34. In a box making machine, the combination with a blank forming mechanism, of a band supplying means, a first presser roller adapted to travel over the side walls of the formed blank and apply thereto a portion of the band, band cutting means, a second presser roller adapted to engage the band and secure the severed portion of said band to said formed blank, a floating member for supporting said second roller, and means for actuating said floating member and the presser roller supported thereby in co-relation with said first presser roller.

35. In a box making machine, the combination with a blank forming mechanism, of a band supplying means, a presser roller adapted to apply the band to the side walls of the formed blank, means for severing said portion of the band from the supply portion, a presser member for applying the severed end of said band portion to the side walls of the formed blank, a floating member for yieldingly supporting said presser member, means for actuating said presser member, and means for actuating said floating member in time relation with said presser member.

36. In a box making machine, the combination with a band applying mechanism, of a blank forming mechanism comprising a forming block traveling in a circular path, members movable with said block for engaging and folding the marginal portions of a blank, and means for actuating said block and said members in time relation with each other.

37. In a box making machine, the combination with a band applying mechanism, of a blank forming mechanism comprising a forming block movable in a horizontal plane, a pair of oppositely disposed members for engaging and folding the marginal end portions of a blank, and a pair of oppositely disposed members for engaging and folding the marginal side portions of said blank, said members being movable in correlation with said block.

38. In a box making machine, the combination with a band applying mechanism, of a blank forming mechanism comprising a forming block movable in a horizontal plane, a pair of oppositely disposed members for engaging and folding the marginal end portions of a blank, a pair of oppositely disposed members for engaging and folding the marginal side portions of said blank, and means for maintaining said members in cooperative relation with said block and in time relation with each other.

39. In a box making machine, the combination with a band applying mechanism, of a blank forming mechanism comprising forming block operable in a circular path, a support operable in correlation with said block, members pivotally mounted on said support for engaging and folding the marginal portions of the blank, and mechanism for moving said support and said block relative to each other.

40. In a box making machine, the combination with a band applying mechanism, of a blank forming mechanism comprising a forming block, means for retaining the blank in forming position, members for engaging and folding the marginal portions of the blank, and mechanism for moving said block from blank engaging position.

41. In a box making machine, the combination with a band applying mechanism, of a blank forming mechanism comprising a forming block, a support, members pivotally mounted on said support for engaging and folding the marginal portions of the blank, means for moving said block and said support relative to each other, means for holding the blank in position preparatory to the forming operations, and means for actuating said pivotal members in time relation with said block and said support actuating means.

42. In a box making machine, a support, a plurality of blank forming sections having fixed relation with said support, each of said forming sections being adapted to receive a single piece blank, means for actuating said support and revolving said sections about a common axis, means for actuating each section in time relation with said revolving means, means for applying a band to each blank when the section occupies a predetermined position, and means for actuating each section in co-operation with said band applying means.

43. In a box making machine, a plurality of blank forming sections each of which is adapted to receive a formed blank, said sections being revoluble about a common axis, mechanism for applying a finishing band to each blank when said sections reach a predetermined position, means for successively moving said blank forming sections, and means for distorting the side walls of the formed blank while the band is being applied thereto.

44. A blank forming mechanism for box making machines comprising in combination with mechanism for applying a retaining strip of material to the formed blank a forming block adapted to receive a blank, a movable support, means for moving said support relative to said blank, blank forming members pivotally mounted on said support, plates pivotally supported adjacent to said block and movable independently thereof for engaging and retaining in position the folded portions of the blank, and means for actuating said block and said plates relative to each other and to said folding members.

45. A blank forming mechanism for box making machines comprising a block adapted to receive a blank, a support movable relative thereto, blank folding members pivotally mounted on said support and adapted to co-operate with said block, and means for discharging the formed blank from said block.

46. In a box making machine, a forming block adapted to receive a blank, a support movable in co-operative relation with said block, forming members pivotally mounted on said support and adapted to fold the edges of said blank against said forming block, means for actuating said forming members in time relation with said support and with said block, and means for applying a finishing band to the folded sides of said blank.

47. In a box making machine, a forming block, means for receiving the blank, means for moving said block relative to said receiving means whereby the blank is positioned on said block, a support movable into a co-operative relation with said block, forming members pivotally mounted on said support and adapted to engage the marginal portions of said blank, means for applying a band to the sides of the formed blank, and plates pivotally supported adjacent to said block and operable for engaging and distorting the sides of formed blank while the band is being applied thereto.

48. In a box making machine, a forming block, means for receiving the blank, means for moving said block relative to said receiving means whereby the blank is positioned on said block, a support movable into co-operative relation with said block, forming members pivotally mounted on said support and adapted to engage the marginal portions of said blank, means for applying a band to the sides of the formed blank, plates pivotally supported adjacent to said block and operable for engaging and distorting the sides of the formed blank while the band is being applied thereto, and means for discharging the formed blank.

49. A blank forming mechanism for box making machines comprising a forming block having concave side walls, a support movable relatively thereto, blank forming members pivotally mounted on said support, means for actuating said members to engage the marginal portions of a blank and fold them against the sides of said block, flexible plates supported adjacent to the side walls of said block and movable relative thereto to engage the folded side walls of said blank and press them against the concave walls thereof, thereby temporarily distorting said marginal portions, and means for applying a band to the distorted side walls of the formed blank.

50. A blank forming mechanism for box making machines comprising a forming block adapted to receive a blank, pivotally supported forming members, means for actuating said members whereby the marginal portions of the blank are folded against the walls of said block, plates supported adjacent to said block and movable relative thereto, means for applying a band to the walls of the formed blank, means for actuating said plates whereby the latter engage the projecting edges of said band and fold it inwardly over the edges of the walls of said formed blank.

51. A blank forming mechanism for box making machines comprising a forming block adapted to receive a blank, pivotally supported forming members, means for actuating said members whereby the marginal portions of the blank are folded against the walls of said block, plates supported adjacent to said block and movable relative thereto, means for applying the band to the walls of the formed blank, and means for actuating said plates in time relation with said forming members and said band applying means, said plates being adapted to engage the projecting edges of said band and fold it over the edges of the side walls of said folded band.

52. A blank forming mechanism for box making machines comprising a forming block adapted to receive a blank, pivotally supported forming members operable to engage the marginal portions of the blank and fold it against the side walls of said block, means for applying a band to the side walls of the formed blank, plates arranged operatively adjacent to the side walls of the block and adapted to fold inwardly the lower projecting edges of the band, and means for actuating said forming members to engage the projecting upper edge of the band and fold it against the bottom wall of the formed blank.

In testimony whereof I hereunto affix my signature this 6th day of January, 1923.

ORPH W. COWGILL.